(12) United States Patent
Nakamura

(10) Patent No.: US 9,020,258 B2
(45) Date of Patent: Apr. 28, 2015

(54) IMAGE PROCESSING APPARATUS AND IMAGE PROCESSING SYSTEM CONFIGURED TO CONVERT COLOR TONE IN IMAGE

(71) Applicant: Satoshi Nakamura, Kanagawa (JP)

(72) Inventor: Satoshi Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 119 days.

(21) Appl. No.: 13/860,678

(22) Filed: Apr. 11, 2013

(65) Prior Publication Data

US 2013/0272606 A1 Oct. 17, 2013

(30) Foreign Application Priority Data

Apr. 13, 2012 (JP) ................................ 2012-092278

(51) Int. Cl.
| | | |
|---|---|---|
| G06K 9/00 | (2006.01) | |
| G06K 9/46 | (2006.01) | |
| G06K 15/02 | (2006.01) | |
| G09G 5/02 | (2006.01) | |
| G06T 5/00 | (2006.01) | |
| H04N 1/60 | (2006.01) | |
| G06T 7/40 | (2006.01) | |

(52) U.S. Cl.
CPC .......... *G06K 9/4652* (2013.01); *G06K 15/1878* (2013.01); *G09G 5/02* (2013.01); *G06T 5/007* (2013.01); *H04N 1/60* (2013.01); *H04N 1/6055* (2013.01); *G06T 7/408* (2013.01); *G06T 2207/10008* (2013.01)

(58) Field of Classification Search
None
See application file for complete search history.

(56) References Cited

U.S. PATENT DOCUMENTS

| 7,978,366 | B2 | 7/2011 | Ming | |
|---|---|---|---|---|
| 2004/0114166 | A1* | 6/2004 | Kubo | 358/1.9 |
| 2005/0146738 | A1* | 7/2005 | Narazaki | 358/1.9 |
| 2005/0200866 | A1* | 9/2005 | Hoshii et al. | 358/1.9 |
| 2008/0304087 | A1* | 12/2008 | Shin et al. | 358/1.6 |
| 2011/0019212 | A1* | 1/2011 | Wang et al. | 358/1.9 |
| 2011/0032544 | A1* | 2/2011 | Wu et al. | 358/1.9 |
| 2012/0189200 | A1 | 7/2012 | Nakamura | |
| 2012/0189209 | A1 | 7/2012 | Nakamura | |
| 2013/0021628 | A1 | 1/2013 | Nakamura | |
| 2013/0027759 | A1 | 1/2013 | Nakamura | |

FOREIGN PATENT DOCUMENTS

| JP | 2009-177790 | 8/2009 |
|---|---|---|
| JP | 2013-030996 | 2/2013 |

OTHER PUBLICATIONS

U.S. Appl. No. 13/681,513, filed Nov. 20, 2012.

* cited by examiner

*Primary Examiner* — Aaron W Carter
*Assistant Examiner* — Feng Niu
(74) *Attorney, Agent, or Firm* — Cooper & Dunham LLP

(57) ABSTRACT

An image processing apparatus includes a first image output device and a second image output device outputting first and second output data from original image data, a color space fixing device for determining a color space for color tone conversion, a color space conversion device, a color component mapping device for generating color component mapping data containing correspondences between pixels in the image data, a color tone conversion parameter fixing device for generating color tone conversion parameters from corresponding pixels in the image data, and a color tone conversion device for converting the image data using the conversion parameters.

11 Claims, 21 Drawing Sheets

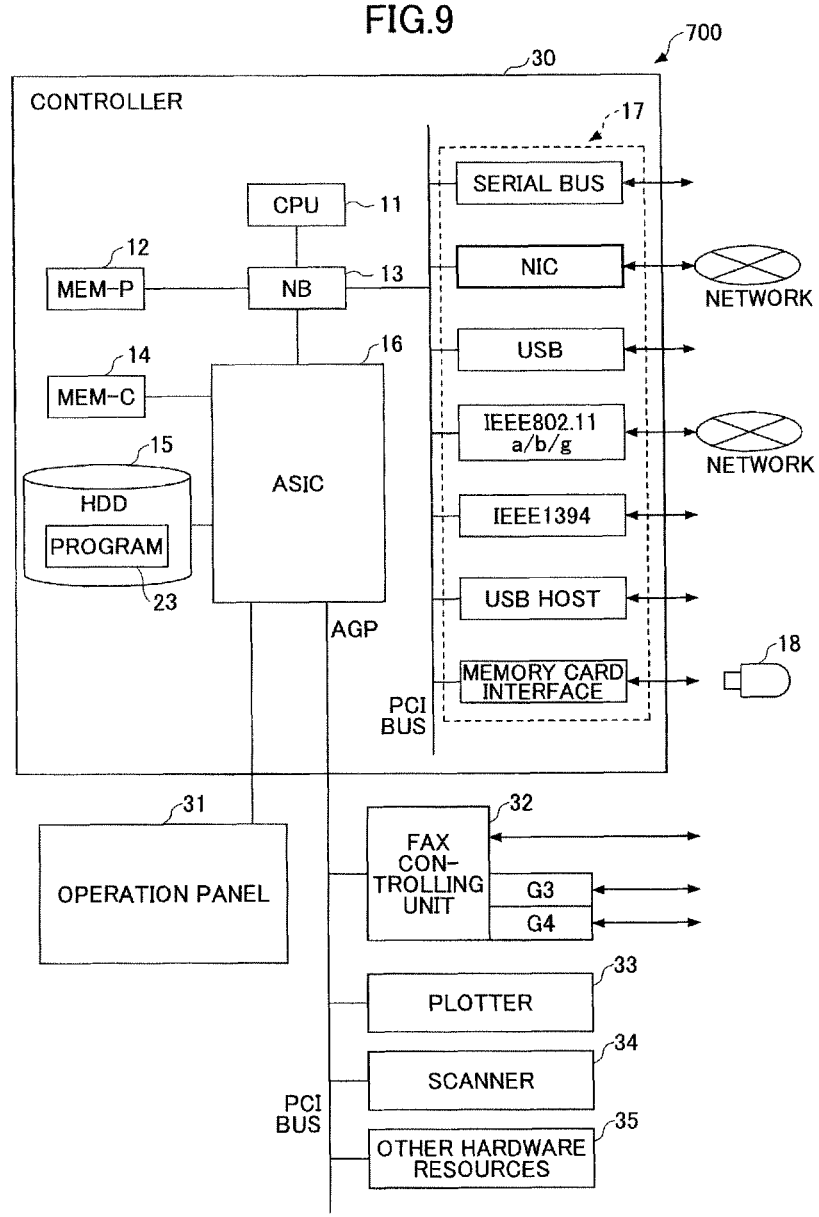

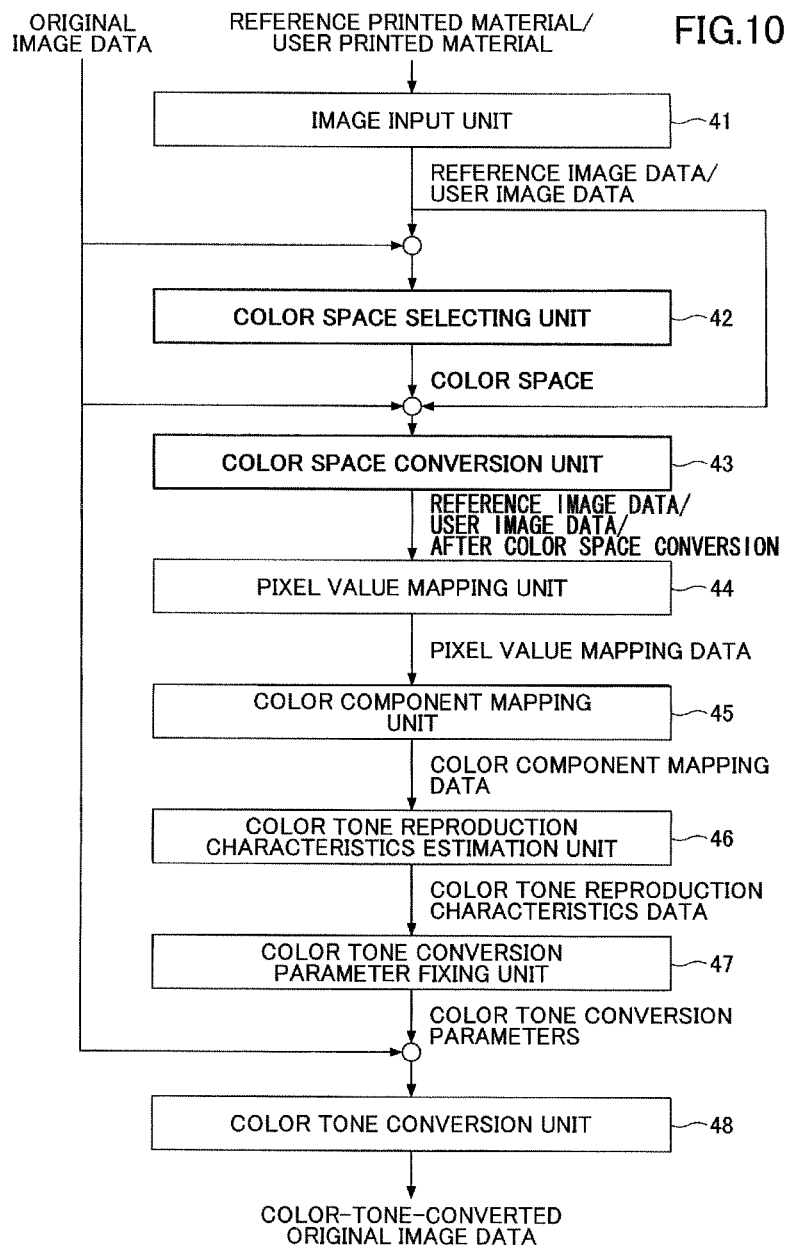

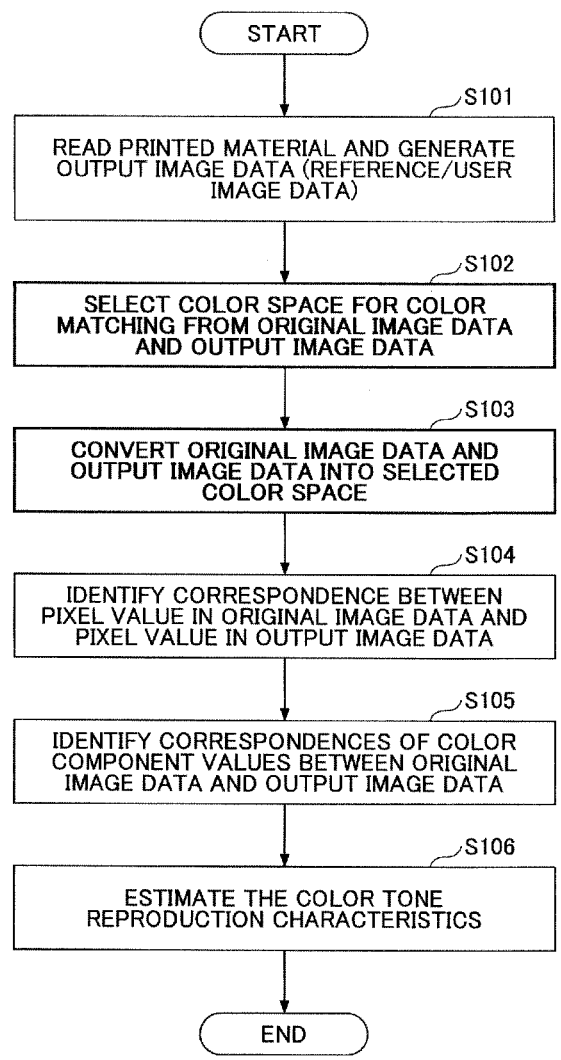

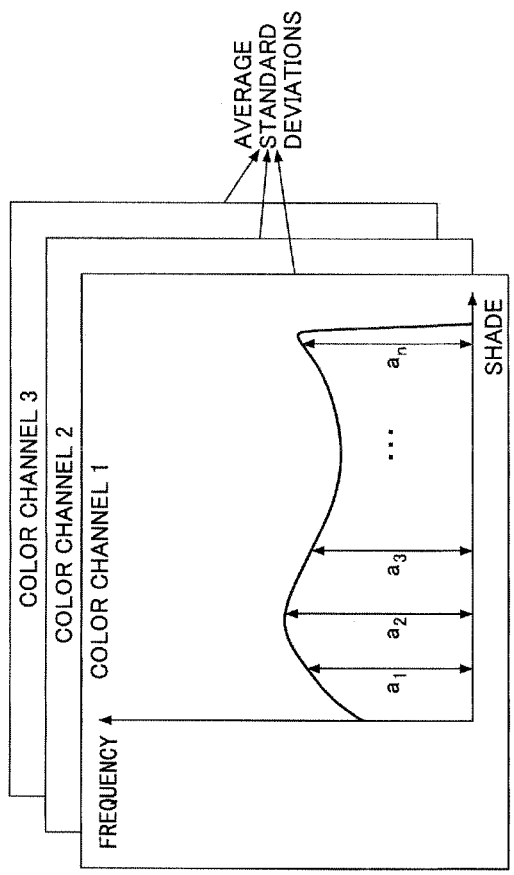

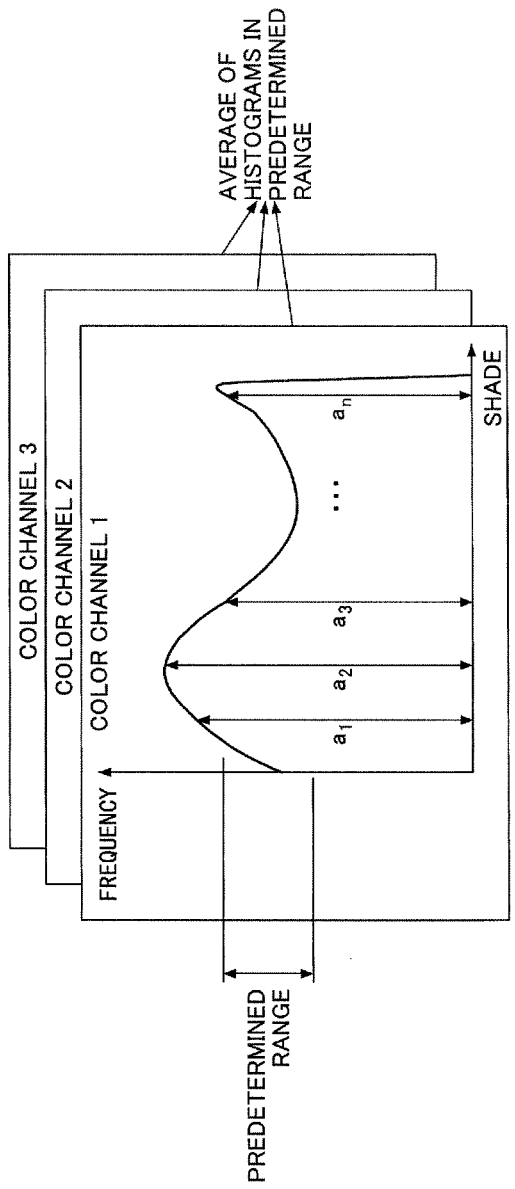

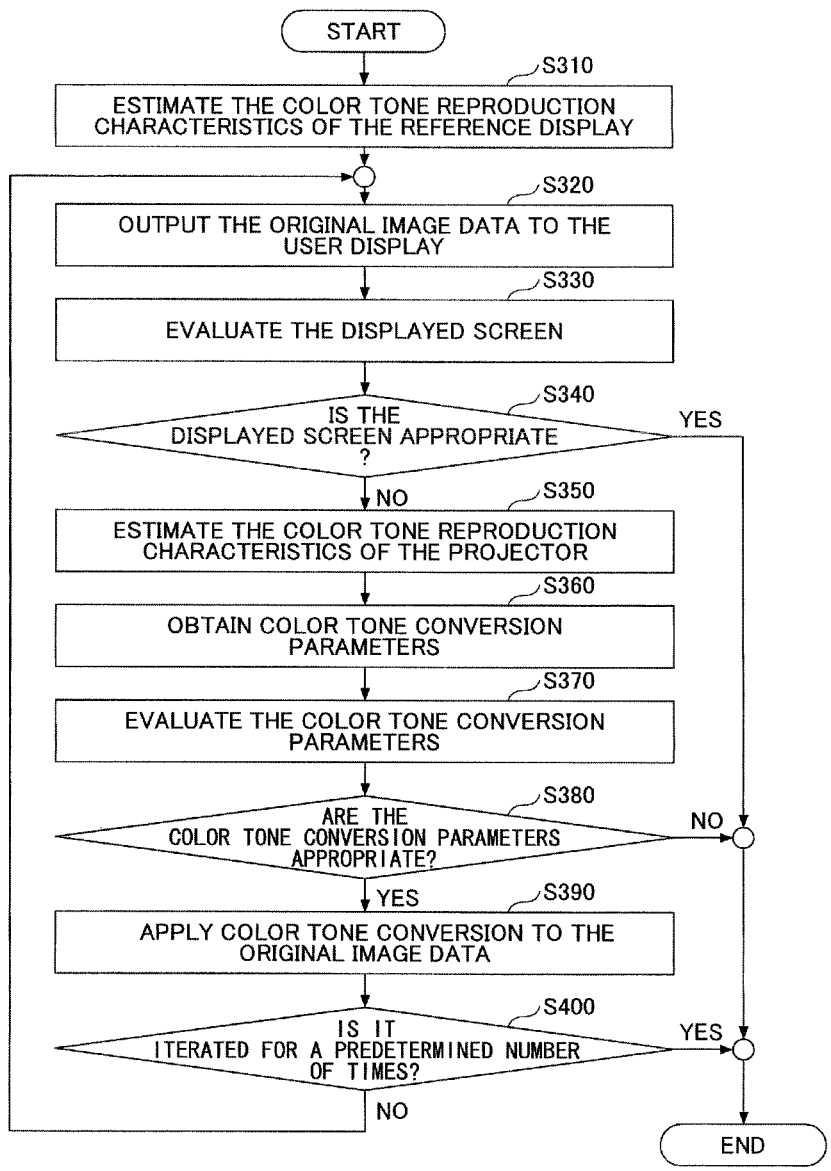

IMAGE PROCESSING APPARATUS AND IMAGE PROCESSING SYSTEM CONFIGURED TO CONVERT COLOR TONE IN IMAGE

BACKGROUND OF THE INVENTION

1. Field of the Invention

The disclosures herein generally relate to an image processing apparatus having a first image output device outputting first output data from original image data, and a second image output device outputting second output data from the original image data in such a way that the color tone of the first output data is reproduced in the second output data.

2. Description of the Related Art

Image output devices such as printers, displays, and the like, need to output image data according to pixel values of original image data. For this purpose, the color profile of an image output device may be updated, according to a comparison between pixel values in the original image data and pixel values in a printed material measured by a colorimeter. In a case of updating the color profile of an image output device, a method using a color chart is widely practiced. In this method, an image output device outputs a color chart whose original pixel values are known beforehand. Then, the printed color chart is measured by a colorimeter such as scanner. The known pixel values and the measured pixel values are compared. Finally, the color profile of the image output device is updated, according to the comparison result. Japanese Laid-open Patent Application No. 2009-177790, for example, discloses details.

There are two patterns of operations for updating the color profile of an image output device. Details are as follows, taking a printer as an example.

a) $1^{st}$ Pattern: Adjusting Color Tone to a Reference Color Chart

In this method, a predetermined reference color chart is printed by the image output device. Each color patch in the color chart is measured by a colorimeter. The color profile of the image output device such as a printer is updated so that the difference between the measured value and the expected value will fall into a predetermined range.

b) $2^{nd}$ Pattern: Adjusting Color Tone to a Reference Image Output Device

As an example of this method, a proofer may be used. A proofer is a calibration device, or a printer that can generate equivalent output as the calibration device. The color tone of the output image from a proofer is matched with the color tone of the output image from the image output device. In this case, the proofer and the image output device print color charts, respectively. Each color patch in the two printed color charts is measured by a colorimeter. The color profile of the proofer is updated so that differences between two measured values of patches fall into a predetermined range.

The previously used color profile update methods, however, have a problem in that these methods cannot be executed when a printed reference color chart is not available. As described above, in a case of matching the color tone of the output image from an image output device with the color tone of the output image from another image output device, both devices need to output the same color chart. In reality, a reference image output device may not be able to output a color chart, or another image output device whose color profile needs to be updated may not be able to obtain a printed material of the color chart from the reference image output device.

As an example of these cases, a commercial printing company may receive an order from a customer. The customer may request the commercial printing company to match the color tone of ordered printed materials with the output image obtained by the customer's printer. If the customer adopts proper color management, it is possible for the commercial printing company to satisfy the customer's request under the circumstances described above. Unfortunately, the customer may not be an expert of color management. Proper color management includes periodic calibration of image output devices, or the adoption of standard color management of image data such as an International Color Consortium profile.

If the reference color chart is not available and the customer does not adopt proper color management, the commercial printing company needs to match colors by hand. This work may be done through a trial and error process, which is time consuming and requires a lot of skill, experiences, and intuition of the operator of this work. Moreover, as the result of color matching is confirmed by using printed materials, this work consumes a lot of paper and the commercial printing company may suffer a loss due to the wasted paper.

Even if the commercial printing company adjusts the color tone with the output result from the customer's printer with an appropriate method, the color tone may not match well if the color space used for color matching is not appropriate.

To solve the inconvenience above, for example, color tone conversion could be applied to an original image before inputting to the target image output device, to obtain the same color tone output result as obtained with the reference image output device. Namely, to obtain the same output result, it could be possible to apply color tone conversion to the original image before inputting to the target image output device (Details will be described later with FIG. 5).

However, if the color space for executing color tone conversion is not appropriate to match the output result, it is difficult to obtain the same output result.

Namely, when executing color matching, it is necessary to use a color space that can appropriately represent the color difference. For example, if a color distribution in an image is confined in a narrow range, a color difference of a color with a few shades may not be extracted appropriately.

In other words, if a color space is available in which a color distribution in an image is dispersed in a wide range, colors having differences can be identified in a whole range of shades, which may result in a highly precise color matching.

Therefore, it is important for color tone conversion to select a color space in which a color distribution is dispersed in a wide range. If a color space in which a color distribution confined in a narrow range is adopted, error differences may be induced outside of the range although highly precise estimation may be possible within the range. In addition, within a range with a small number of pixels, color differences may disappear after color tone conversion.

SUMMARY OF THE INVENTION

It is a general object of at least one embodiment of the present invention to provide an image processing apparatus that substantially obviates one or more problems caused by the limitations and disadvantages of the related art. Specifically, it may be desirable to provide an image processing apparatus that can execute color tone conversion using an appropriate color space for color tone conversion.

According to at least one embodiment of the present invention, an image processing apparatus for causing a first image output device to output first output data from original image data and a second image output device to output second output data from the original image data, includes a color space fixing device configured to determine that a color space is appropriate for color tone conversion among multiple color spaces by referring to at least one of the original image data, first output image data obtained by capturing the first output data with an input device, and second output image data obtained by capturing the second output data with the input device; a color space conversion device configured to convert a color space of each of the original image data, the first output image data, and the second output image data to the color space determined by the color space fixing device, to generate converted original image data, first converted output image data, and second converted output image data; a color component mapping device configured to generate first color component mapping data containing correspondences between pixel values in the first converted output image data and pixel values in the converted original image data, and second color component mapping data containing correspondences between pixel values in the second converted output image data and pixel values in the converted original image data; a color tone conversion parameter fixing device configured to utilize the first color component mapping data and the second color component mapping data to generate color tone conversion parameters from pairs of a pixel value in the first output image data and a pixel value in the original image data, the pixel value in the original image data when output as the second output image data having a pixel value equal to the pixel value in the first output image data; and a color tone conversion device converting pixel values in the original image data in response to the color tone conversion parameters.

According to at least one embodiment of the present invention, it is possible to provide an image processing apparatus that can execute color tone conversion using an appropriate color space for color tone conversion.

BRIEF DESCRIPTION OF THE DRAWINGS

Other objects and further features of embodiments will be apparent from the following detailed description when read in conjunction with the accompanying drawings, in which:

FIG. 9 is a hardware configuration diagram of a multifunction peripheral (MFP) when a color tone conversion parameter generating system consists of one MFP;

FIG. 10 is a functional block diagram of a color tone conversion parameter generating system, or an MFP;

FIG. 11 is a flowchart illustrating a procedure in which an image input unit captures a reference printed material and a user printed material, then, a color tone reproduction characteristics estimation unit generates color tone reproduction characteristics data;

FIGS. 12A-12B are schematic views illustrating evaluations based on frequency distribution;

FIG. 20 is a flowchart illustrating the steps executed by a color tone conversion parameter generating system, or by an MFP, to generate color tone conversion parameters according to the second embodiment.

DESCRIPTION OF THE PREFERRED EMBODIMENTS

In the following, embodiments of the present invention will be described with reference to the accompanying drawings.

Figure 1:
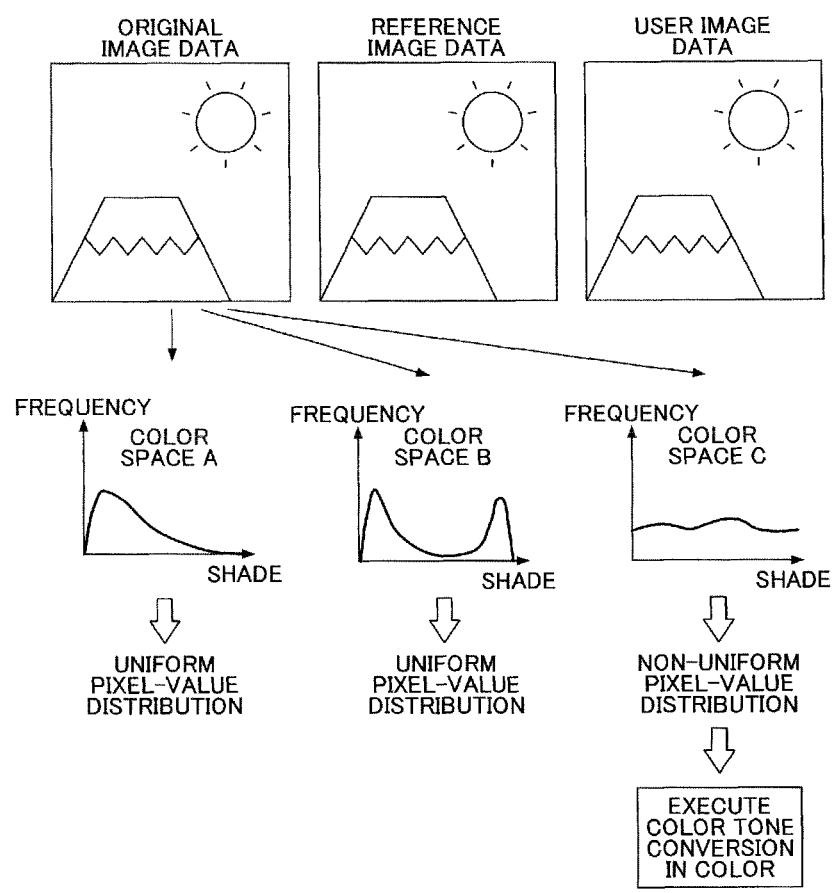
FIG. 1 is a schematic view illustrating features of a color tone conversion parameter generation system according to a first embodiment of the present invention.

FIG. 1 is a schematic view illustrating features of a color tone conversion parameter generation system according to the present embodiment. Here, reference image data and user image data refer to image data that are obtained by printing original image data with different printers (or with a single printer with a certain interval), then by capturing with a scanner or the like. Details of the original image data, reference or user image data will be described later.

The color tone conversion parameter generation system evaluates histograms (frequencies) of pixel values in several arbitrary selected color spaces, for example, using the reference image data. In FIG. 1, a color space A has a peak of pixel values in a low range of shades, whereas a color space B has a peak of pixel values in a high range of shades.

When converting the user image data so that the color tone is matched with the reference image data, it may be possible to match the color tone of the user image data with the reference image data in a wide range of shades if sufficient pieces of data are provided in the whole range.

Therefore, the color tone conversion parameter generation system selects a color space such as a color space C for color tone conversion, in which pixel values are uniformly distributed in a wide range of shades. This is one of features of the color tone conversion parameter generation system according to the present embodiment.

Pixel value distributions in a range of shades do not differ much between the reference/user image data and the original image data because the reference/user image data are obtained by printing the original image data. Therefore, when selecting a color space, either of the original image data or the reference/user image data can be used. In the following, it is assumed that the original image data is used for the selection of a color space.

[Summary of Color Tone Conversion]

First, terms are defined here that will be used in the following:

The color tone reproduction characteristics of the first image output device is denoted as $P_1(x)$.

The color tone reproduction characteristics of the second image output device is denoted as $P_2(x)$.

The color tone reproduction characteristics of an image input device is denoted as $S(x)$.

The first color tone reproduction characteristics can be denoted as $S(P_1(x))$.

The second color tone reproduction characteristics can be denoted as $S(P_2(x))$.

Here, "x" represents a color or a pixel value. Since a pixel value can be regarded as a color in a specific color space, they may be used interchangeably, although pixel value and color may not be equivalent when considering various color spaces.

$P_1(x)$ is a printed color when the first image output device prints a pixel value x, and $S(P_1(x))$ is a shade when an image input device captures the color $P_1(x)$. $P_2(x)$ is a printed color when the second image output device prints the pixel value x, and $S(P_2(x))$ is a shade when the image input device captures the color $P_2(x)$.

When the first and the second image output devices print the same pixel value x, $S(P_1(x))=S(P_2(x))$ may not be satisfied because the color tone reproduction characteristics of the two devices may be different from each other. On the other hand, even if a pixel value printed by the first image output device is not equal to another pixel value printed by the second image output device, it is possible that there exists a pair of colors, a and b, denoted (a, b) hereafter, such that $S(P_1(a))=S(P_2(b))$. It is noted that $S(P_1(a))$ and $S(P_2(b))$ do not need to be exactly the same.

The image processing apparatus of the present embodiment seeks one or more pairs of (a, b) such that $S(P_1(a))=S(P_2(b))$. Once such a pair is obtained, the first and the second image output devices can print materials in the same color tone because the second image output device can convert the pixel value "a" into the pixel value "b" before printing. The conversion results in a printed color $S(P_2(b))$ which is equal to $S(P_1(a))$.

Figure 2:
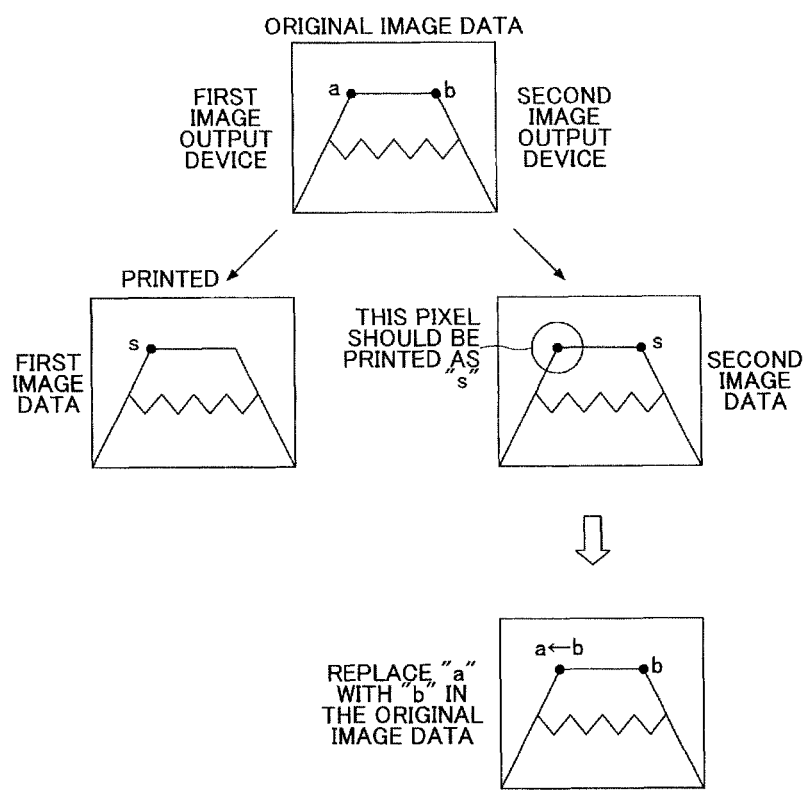
FIG. 2 is a schematic view illustrating a summary of color tone conversion.

FIG. 2 is a schematic view illustrating a summary of color tone conversion. The first image output device and the second image output device print the same image data that is referred to as the original image data.

The first image output device prints a first output material in which the printed pixel value "a" has a shade "s" when captured by a scanner. The second image output device prints a second output material in which the printed pixel value "b" has a shade "s" when captured by the scanner. When matching the color tone reproduction characteristics of the second image output device with the characteristics of the first image output device, the second image output device needs to print the pixel value "a" so that the printed color of "a" is regarded as "s" by the scanner. Therefore, the second image output device converts the pixel value "a" into "b". With this color conversion, it is possible for the second image output device to print materials in the same color tone as the first image output device does.

Figure 3A:
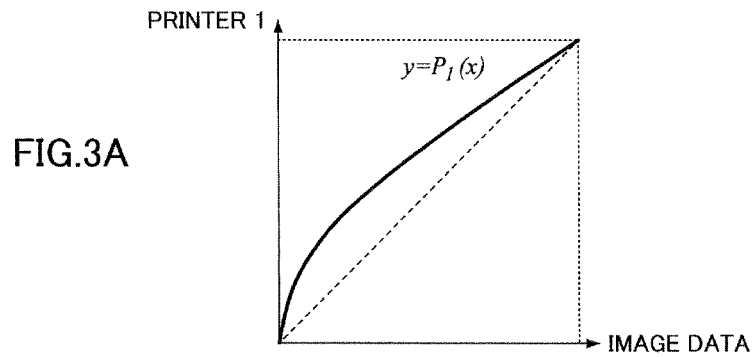
FIG. 3A-3C are schematic views illustrating color tone conversion characteristics.
Figure 3B:
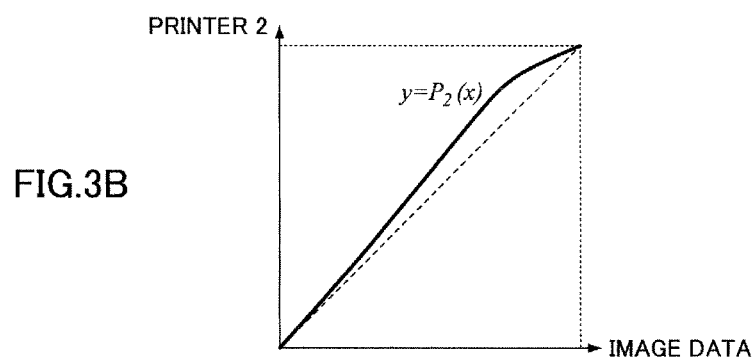
Figure 3C:
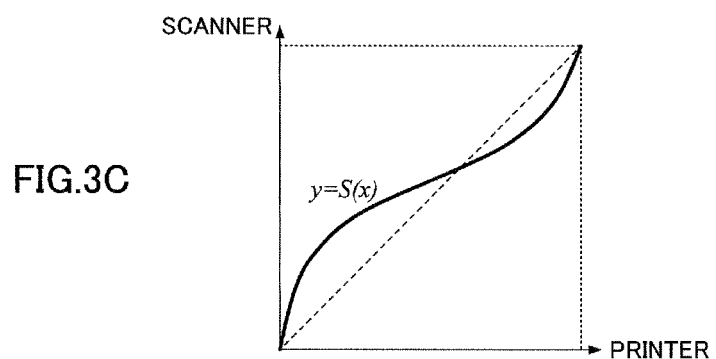

Color tone reproduction characteristics will be further explained with FIGS. 3A-3C in which a printer is taken as an image output device and a scanner is taken as an image input device. FIG. 3A and FIG. 3B are schematic views illustrating color tone reproduction characteristics. The color tone reproduction characteristics of the first image output device can be rephrased as how the first image output device maps a color in the original image data into a shade. Therefore, the color tone reproduction characteristics can be shown graphically as a solid curve in FIG. 3A in which the horizontal axis represents colors in the image data and the vertical axis represents shades of the color in the printed material of the image data.

The dashed line shows the provisional color tone reproduction characteristics in which a color in the original image data is the same as the shade in the printed material. Comparing the dashed line with the solid curve, dark portions in the image data are assigned more shades than bright portions.

Similarly, the solid curve in FIG. 3B shows the color tone reproduction characteristics of the second image output device. Again in FIG. 3B, dark portions in the image data are assigned more shades than bright portions. Compared to FIG. 3A, bright portions in the image data are assigned more shades than dark portions.

On the other hand, the color tone reproduction characteristics of the image input device can be rephrased as how the image input device maps a shade in the image data at an input printed material data into a color. Therefore, with the horizontal axis representing shades of the color in the printed material and the vertical axis representing of colors in the image data, the color tone reproduction characteristics of the image input device can be shown as the solid curve in FIG. 3C. In FIG. 3C, dark portions and bright portions in the image data are assigned more pixel values and pixel values in intermediate portions are compressed.

If the printer profile or the scanner profile is provided, the color tone reproduction characteristics described above can be obtained. Even if the printer profile is not provided, the printer profile can be obtained by having the printer print a color chart, which in turn is measured by a colorimeter. The scanner profile can be obtained by scanning a color chart, and comparing the results with the measured values.

According to the present embodiment, it is possible to estimate the color tone reproduction characteristics even if at least one of the printer profiles is not provided, or the color chart cannot be printed.

It is noted that a color difference can be represented by not only a numerical value of the color difference, but also a difference between estimated color tone reproduction characteristics. In the following, it is assumed that a color difference is represented by a difference between estimated color tone reproduction characteristics. To detect a difference between estimated color tone reproduction characteristics, color tone reproduction characteristics need to be estimated precisely.

Figure 4:
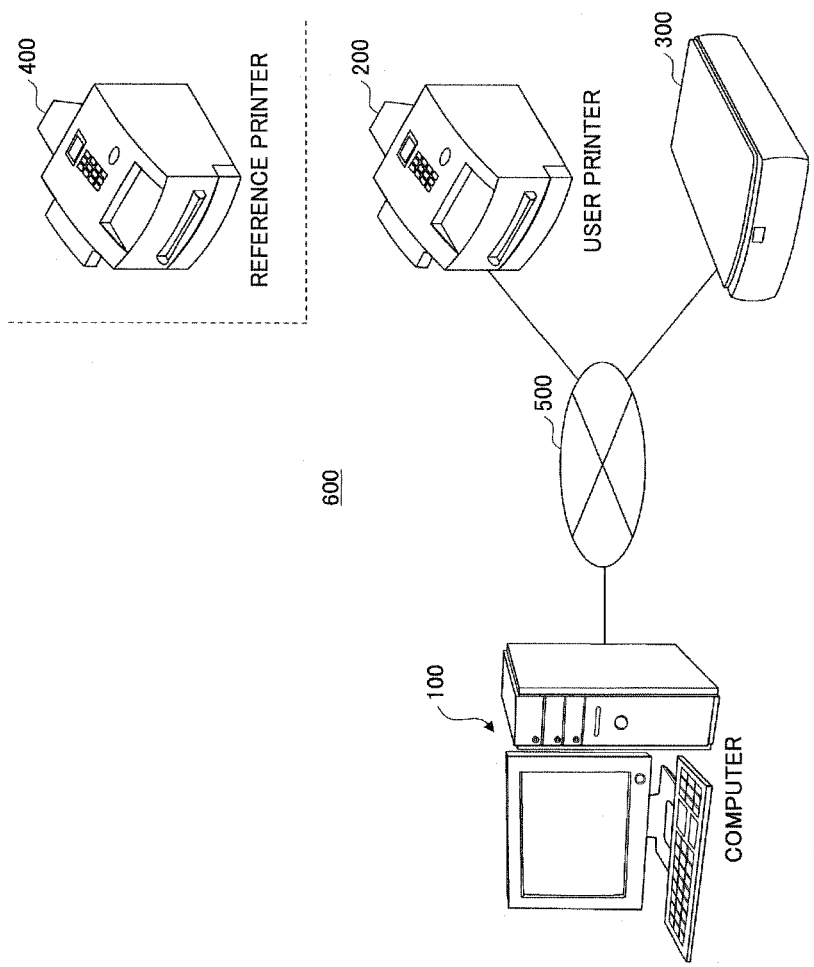
FIG. 4 is a configuration diagram of a color tone conversion parameter generating system.

FIG. 4 is a configuration diagram of a color tone conversion parameter generating system 600. The summary of generation of the color tone conversion parameter will be explained in detail. To match color tones between the first and the second image output devices, the color conversion is applied to the original image data. The flow of this process will be explained. Devices and image data used in the following explanation are listed and defined as follows:

The first image output device is a printer, called a "reference printer".

The second image output device is another printer, called a "user printer".

The image input device is a scanner.

Reference printer corresponds to the first image output device whose color tone serves as a target to be achieved.

User printer corresponds to the second image output device whose color tone will be converted to match the color tone of the reference printer 400.

Scanner corresponds to the image input device.

Original image data is image data used by the printers to produce printed materials.

Reference printed material is a printout of the original image data printed by the reference printer 400, which is the target of color tone matching.

Reference image data is image data obtained by capturing the reference printed material using the image input device.

User printed material is a printout of the original image data printed by the user printer 200, whose color tone needs to be matched to the reference image data.

User image data is the image data obtained by capturing the user printed material using the image input device.

In the present embodiment, the reference printed material and the user printed material are used and a color tone conversion is applied to the original image data, which will be given to the user printer 200. By doing so, the user printed material with the same color tone as the reference printed material will be obtained.

The device that executes the color tone conversion may be either one of the second image output device, the scanner 300, or the computer 100, which may be separated from other devices. In the present embodiment, the computer 100 is supposed to execute generation of color conversion parameters. The steps to generate color conversion parameters are as follows.

Figure 5:
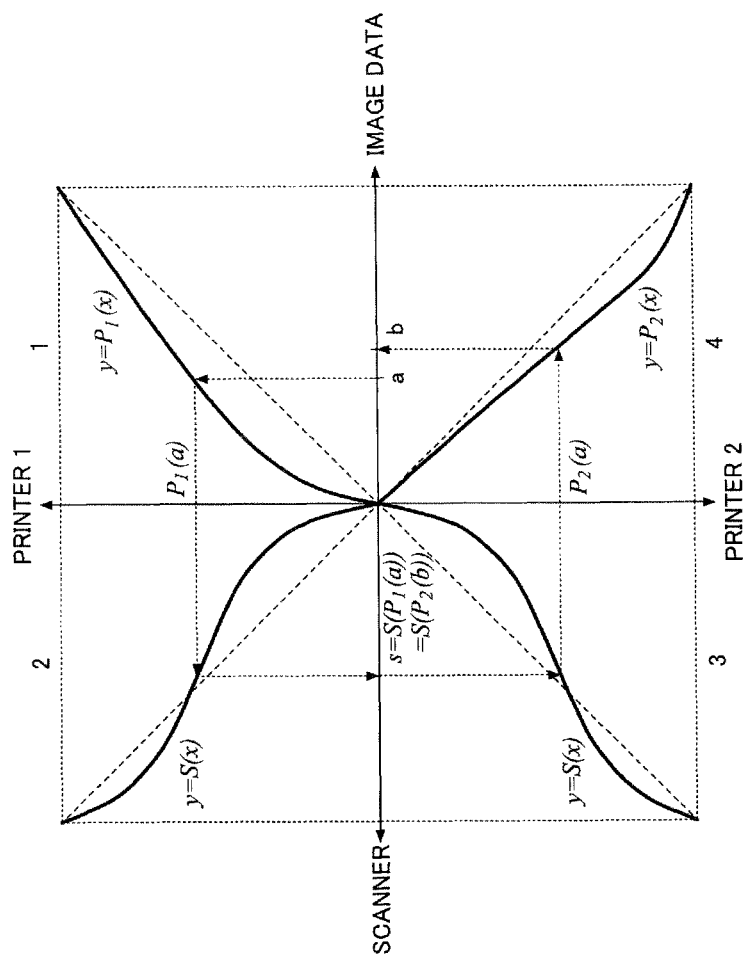
FIG. 5 is a conceptual diagram illustrating generation of color tone conversion parameters.

FIG. 5 is a conceptual diagram illustrating the following steps to generate color conversion parameters.

(1) Estimation of the First Color Tone Reproduction Characteristics

First, combined reference color tone reproduction characteristics, $S(P_1(x))$, will be estimated by the following steps. The combined characteristics of the reference printer 400 and the scanner 300 are estimated because it is difficult to separately extract the color tone reproduction characteristics of the reference printer.

(1-1) The reference printed material is captured by the scanner 300 and the reference image data is obtained.

(1-2) The position, tilt and size of the original image data and the reference image data are adjusted.

(1-3) Pixels at corresponding positions in the original image data and the reference image data are identified and the corresponding colors are stored.

(1-4) A color in the reference image data that corresponds to a pixel value in the original image data is identified.

(2) Estimation of the Second Color Tone Reproduction Characteristics

Next, combined user color tone reproduction characteristics, $S(P_2(x))$, will be estimated by the following steps. $S(P_2(x))$ represents the combined characteristics of the user printer 200 and the scanner 300.

(2-1) The original image data is printed by the user printer 200 and the user printed material is obtained.

(2-2) The user printed material is captured by the scanner 300 and the user image data is obtained.

(2-3) The position, tilt and size of the original image data and the user image data are adjusted.

(2-4) Pixels at corresponding positions in the original image data and the user image data are identified and the corresponding colors are stored.

(2-5) A color in the user image data that corresponds to a pixel value in the original image data is identified.

(3) Estimation of Color Tone Conversion Parameters

Color tone conversion parameters are obtained from the reference color tone reproduction characteristics and the user color tone reproduction characteristics.

(3-1) From the reference color tone reproduction characteristics, a color in reference image data, $s=S(P_1(a))$, which corresponds to a color "a" in the original image data, is obtained.

(3-2) From the user color tone reproduction characteristics, a color "b" in original image data that corresponds to a color $s=S(F_2(b))$ in the user image data is obtained.

(3-3) The correspondence between the color "a" and the color "b" is identified, i.e., a pair of colors (a, b) that satisfies $S(P_1(a))=5=S(P_2(b))$ is obtained.

(3-4) Color tone conversion parameters are derived from pairs of colors such as (a, b) in the original image data.

(4) Color Tone Conversion of the Original Image Data

Finally, the color tone conversion of the original image data is done with the color tone conversion parameters, and the original image data is updated. Following the steps (1) to (4), the user data that is obtained from the color-tone-converted original image data printed by the user printer 200 has substantially the same color tone as that of the reference image data. The steps (1) to (4) may be iterated until the color tone difference between the reference image data and the user image data falls into a predetermined range if only one pass of the steps (1) to (4) does not result in substantially the same color tone. In case of iteration, the converted original image data after the color tone conversion is used when estimating the color tone reproduction characteristics of the user printer 200.

FIG. 5 is a conceptual diagram illustrating the steps (1) to (3). FIG. 5 consists of the following graphs located in its four quadrants, respectively:

FIG. 3A is located in the first quadrant.

A horizontally-reversed image of FIG. 3C is located in the second quadrant.

A 180-degree-rotated image of FIG. 3C is located in the third quadrant.

A vertically-reversed image of FIG. 3B is located in the fourth quadrant.

The above steps (1) to (3) correspond to FIG. 5 as follows:

Step (1), which estimates the reference color tone reproduction characteristics, corresponds to drawing the graph in the first and second quadrants.

Step (2), which estimates the user color tone reproduction characteristics, corresponds to drawing the graph in the third and fourth quadrants.

Step (3), which estimates the color tone conversion parameters, corresponds to identifying pairs of colors (a, b) that satisfy $S(P_1(a))=S(P_2(b))$, as indicated with arrows in FIG. 5.

It is noted that although in the above steps (1) and (2), the combined characteristics of the printer and the scanner 300 are estimated, these characteristics are separately displayed in FIG. 5 for the sake of convenience.

[Pixel Value Distribution in Color Space]

As shown in FIGS. 3 and 5, when matching the color tone between the reference printed material and the user printed material, high precision color tone reproduction characteristics can be obtained if pixel values of the original image data and the reference/user image data are widely distributed in a color space. Namely, it is desirable that pixel values of the original image data and the reference/user image data pixel values are widely distributed evenly and uniformly in a color space. If pixel values are distributed evenly in a wide range, it is possible to precisely estimate color tone reproduction characteristics in the whole range of shades. On the other hand, if pixel values are confined in a narrow range, estimation precision improves in a high pixel-density range whereas estimation precision deteriorates in a low pixel-density range whereas.

Although the number of pixels may be relatively small that are affected by the deteriorated color tone reproduction characteristics in a low pixel-density range, the deterioration of an image may be highlighted if there are a few great error differences. Moreover, if smoothing is applied when estimating color tone reproduction characteristics to secure continuity between shades in color tone reproduction characteristics, there is a risk that an error difference in a low pixel-density range may propagate to other shades.

Figure 6A:
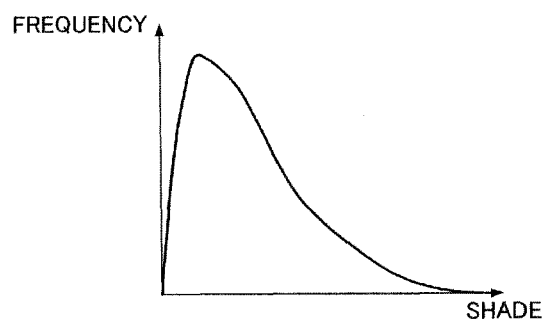
FIGS. 6A-6C are schematic views illustrating selection of an optimum color space for color tone conversion using a histogram of pixel value frequencies.
Figure 6B:
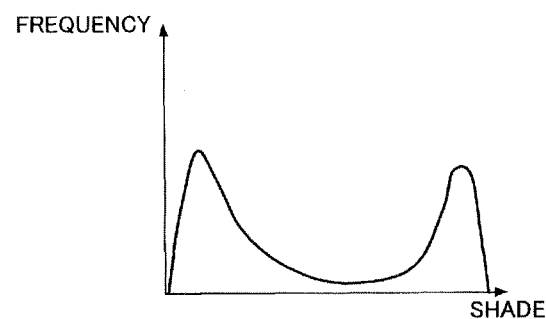
Figure 6C:
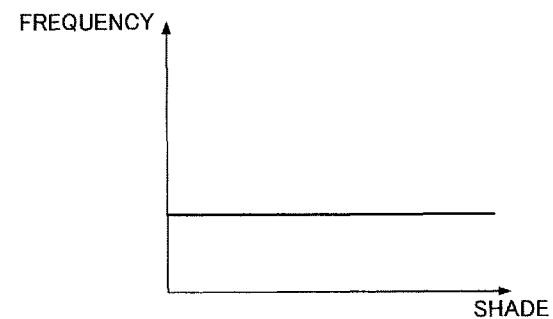

As a method for analyzing a pixel value distribution in a color space, there is a method of generating a histogram of pixel value frequencies. FIGS. 6A-6C are schematic views illustrating selection of an optimum color space for color tone conversion using a histogram of pixel value frequencies.

In FIG. 6A-6C, pixel value frequencies are taken with respect to shades. The horizontal axis represents shades, and the vertical axis represents pixel value frequency to represent the frequency of pixels having each shade. In FIG. 6A, color tone reproduction characteristics are more precisely estimated at lower shades than at higher shades because the lower shades have higher frequencies (or densities) of pixels, whereas the higher shades have lower frequencies.

In FIG. 6B, color tone reproduction characteristics are more precisely estimated at lower and higher shades than at middle shades because the lower and higher shades have higher frequencies, whereas the middle shades have lower frequencies.

In FIG. 6C, all shades have substantially the same frequency. FIG. 6C is an idealistic case in which color tone reproduction characteristics are estimated uniformly for all shades, which prevents a great error difference from being generated to enable a stable and highly precise color tone conversion.

Comparing the case in which all shades have substantially the same frequency of pixels with a case in which pixels are concentrated in a specific shade, the former case has a relatively low frequency at the shade in which pixels concentrate in the latter case. A relatively low frequency might result in relatively low estimation precision of color tone reproduction characteristics. However, sufficient estimation precision can be secured even if the frequency is relatively low as long as the frequency is not absolutely low.

On the other hand, if pixels concentrate in a specific shade, shades other than the concentrated shade may have absolutely low frequencies. Therefore, if pixels are uniformly distributed in an image having a sufficient number of pixels, it can be expected to securely obtain absolutely sufficient frequencies. Thus, it is preferable to have a histogram with uniform pixel value frequencies.

One of features in the present embodiment is that a color space is adaptively selected so that pixels are uniformly distributed. Specifically, a characteristic of a histogram of pixels is utilized in that a histogram of pixels changes its shape depending on a color space to represent an image.

By selecting a color space with which pixels are distributed uniformly, it is possible to select the most suitable color space to estimate color tone reproduction characteristics, to maximize estimation precision of color tone reproduction characteristics as well as realize stable and highly precise color matching.

First Embodiment

The color tone conversion parameter generating system 600 in FIG. 4 includes the computer 100, the user printer 200, and the scanner 300 connected via the network 500. Instead of the scanner 300, a spectrophotometer or a camera may be used. The reference printer 400 that is not assumed to be in the user environment of the color tone conversion parameter generating system 600, may be or may not be connected to the network 500. A user of the color tone conversion parameter generating system 600 already has, or can have a reference printed material.

The network may include a local area network (LAN) in a company, a wide area network (WAN), an IP-Virtual Private Network (IP-VPN), the Internet, or a combination of these. The network may also include telephone lines regardless of wired or wireless connection provided so that the computer 100, the user printer and the scanner can communicate through the network.

In a case of adjusting past colors and present colors on a single printer, the reference printer 400 and the user printer do not necessarily need to be separate devices. The reference printer 400 and the user printer may have functions such as scanning, FAXing, or copying other than printing. Similarly, the scanner 300 may have functions such as printing, FAXing, or copying other than scanning. A device with multiple functions is often called MFP (Multifunction Peripheral).

The computer 100 estimates the color tone conversion parameters from three pieces of image data: the original image data used by the reference printer 400 when printing the reference printed material, the reference image data obtained by the scanner 300 when capturing the reference printed material, and the user image data obtained by the scanner 300 when capturing the user printed material printed by the printer 200 from the original image data. The original image data may be stored in the user printer 200 beforehand, or obtained from the reference printer 400. The computer 100, the user printer 200, and the scanner 300 may be integrated into a single MFP.

Figure 7:
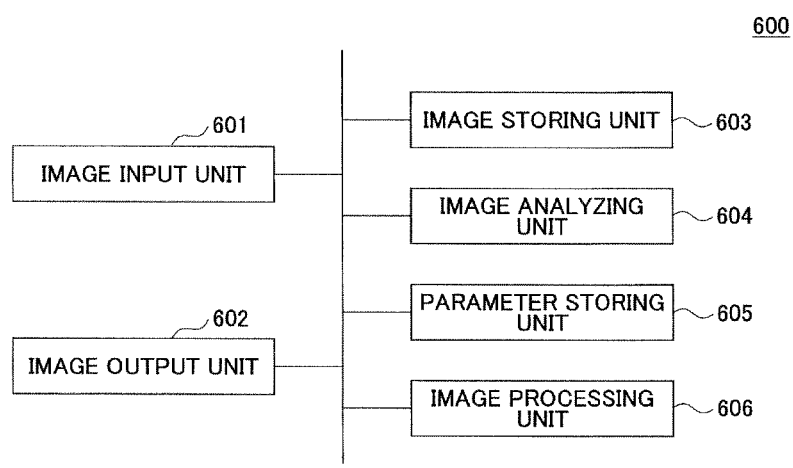
FIG. 7 is a hardware configuration diagram of a color tone conversion parameter generating system.

FIG. 7 is a hardware configuration diagram of the color tone conversion parameter generating system 600. The color tone conversion parameter generating system 600 includes an image input unit 601, an image output unit 602, an image storing unit 603, an image analyzing unit 604, a parameter storing unit 605, and an image processing unit 606.

The image input unit 601 captures the image output by an image output device, and corresponds to the scanner 300 in FIG. 4. The image storing unit 603 stores the image data obtained by the image input unit 601, and corresponds to the computer 100 in FIG. 4. The image analyzing unit 604 analyzes the reference image data, the user image data and the original image data to generate color tone conversion parameters, and corresponds to the computer 100 in FIG. 4. The parameter storing unit 605 stores the color tone conversion parameters obtained by analyzing the image data, and corresponds to the computer 100 in FIG. 4. The image processing unit 606 executes color tone conversion based on the obtained color tone conversion parameters, and corresponds to the user printer 200 in FIG. 4. The image output unit 602 outputs the color-tone-converted image, and corresponds to the user printer 200 in FIG. 4.

Figure 8:
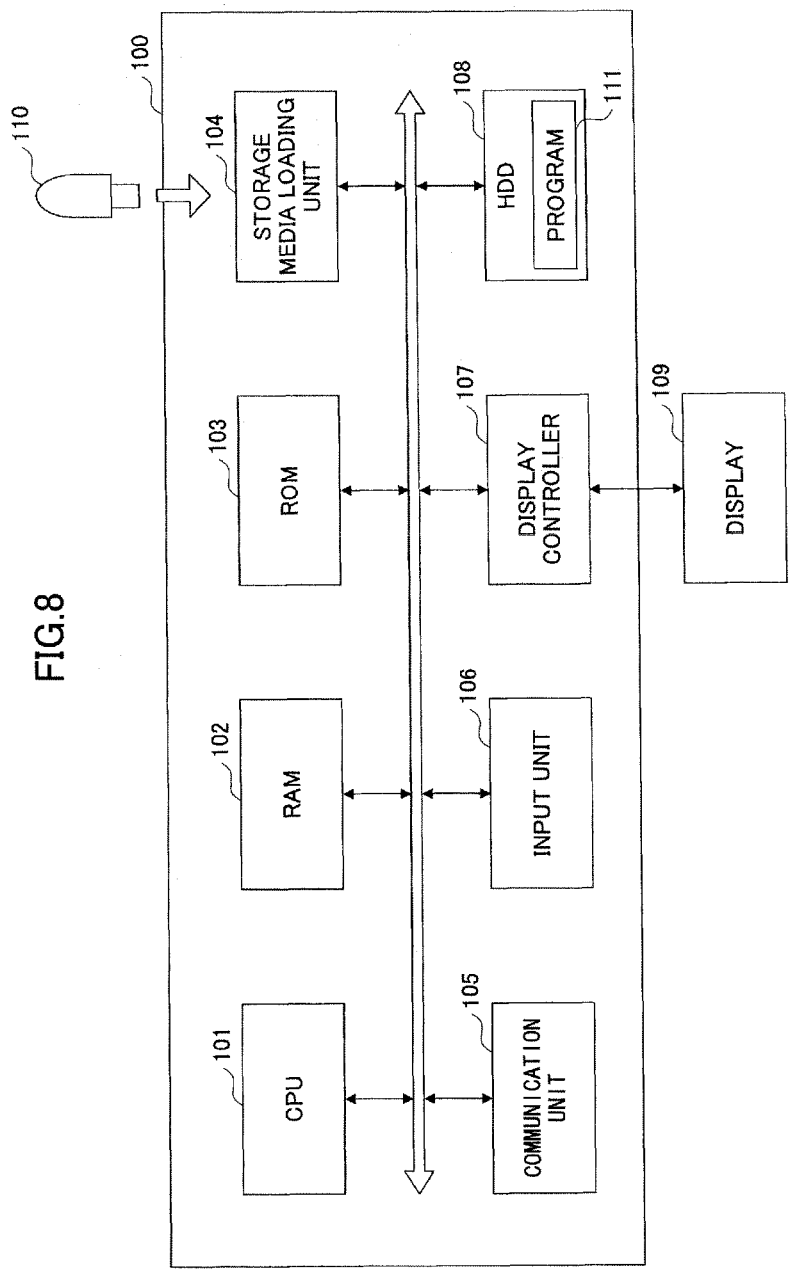
FIG. 8 is a hardware configuration diagram of a computer.

FIG. 8 is a hardware configuration diagram of the computer 100. The computer 100 has a CPU 101, a RAM 102, a ROM 103, a storage media loading unit 104, a communication unit 105, an input unit 106, a display controller 107, and a hard disk drive (HDD) 108. These units are connected to a bus. The CPU 101 reads operating system (OS) programs or other programs from the HDD 108 and executes these programs to offer various functions. The CPU 101 also performs a process of generating color tone conversion parameters.

The RAM 102 is a working memory, or main memory to temporarily store data required for the CPU 101 to execute programs. The ROM 103 stores a basic input output system (BIOS), i.e., programs for starting up the OS, and also static data.

The storage media loading unit 104 can load and unload a storage medium 110, reads data recorded on the storage medium 110 and stores the data in the HDD 108. The storage media loading unit 104 may write data stored in the HDD 108 into the storage medium 110. The storage medium 110 may be an USB memory device, an SD card, or the like. The program 111 is distributed by the storage medium 110 or downloaded from servers not illustrated here.

The input unit 106 includes a keyboard, a mouse, a trackball, and the like. The input unit 106 receives, as input, various user commands to be supplied to the computer 100.

The HDD 108 may be replaced with non-volatile storage devices such as solid state drives (SSDs).

The communication unit 105 is a network interface card (NIC) such as an Ethernet card.

The display controller 107 generates and displays screen images on the display 109 by interpreting graphic commands stored in a graphic memory. The graphic commands are stored by the CPU 101 upon executing the program 111.

FIG. 9 is a hardware configuration diagram of a multifunction peripheral (MEP) 700 when the color tone conversion parameter generating system 600 is implemented on a single MEP. The MFP 700 includes a controller 30, an operation panel 31, a FAX controlling unit 32, a plotter 33, a scanner 34, and other hardware resources 35. The controller 30 includes a CPU 11, a MEM-P 12, an NB 13, an ASIC 16, a MEM-C 14, an HDD 15, and peripheral devices 17 connected to the NB 13 via a PCI bus.

In the controller 30, the ASIC 16 has connections with the MEM-C 14, the HDD 15, and the NB 13. The NB 13 has connections with the CPU 11 and the MEM-P 12. The NB 13 is one chip of the CPU chipset which is a bridge for connecting the CPU 11, the MEM-P 12, the ASIC 16, and peripheral devices.

The ASIC 16 is an integrated circuit (IC) chip for various kinds of image processing. The ASIC 16 also has a role of a bridge for connecting an AGP, the HDD 15, and the MEM-C 14, respectively. The CPU controls the MEP 700 as a whole, while it activates and executes various programs implemented on the MFP 700.

The MEM-P 12 is a system memory used by the system of the MFP 700 and the MEM-C 14 is a local memory used as a buffer while processing the image data.

The HDD 15 is a mass storage device, which may be replaced with SSDs. The HDD 15 stores the OS, various application programs, and various data including font data. The HDD 15 also stores a program 23 for generating color tone conversion parameters. The program 23 is distributed by the storage medium 18 or downloaded from servers not illustrated here.

The Peripheral devices 17 include a serial bus, a NIC, a USE host, IEEE802.11a/b/g/n, IEEE1394, and a memory card interface. The serial bus may be connected to a Centronics cable. The NIC controls communication via network. The USE host is connected an USB device via USB cable. IEEE802.11a/b/g/n are interfaces for wireless LAN that control wireless communication. IEEE1394 is an interface for controlling high-speed serial communication. The memory card interface loads various memory cards, and reads/writes data from/to the cards. Memory cards include, for example, SD cards, multimedia cards, xD cards, and the like.

The operation panel 31 includes a hardware keyboard and a display device such as an LCD display. The operation panel 31 receives input operations from a user, and displays various information on the screen. The operation panel 31 may have a touch panel, which may be used as a software keyboard for user operations.

The FAX controlling unit 32 is connected to a public communication network via a network control unit (NCU). The FAX controlling unit 32 may send/receive facsimile according to communication protocols for G3/G4 compliant facsimile. The FAX controlling unit 32 may apply signal processing such as data compression or modulation to sending image data, or may apply signal processing such as data expansion or error correcting to receiving data to recover the image data.

The plotter 33 is, for example, a monochrome or color electrophotographic plotter which forms and transfers pages of image data onto paper according to the data to be printed or the data captured by the scanner 34. For example, the plotter 33 may adopt an electrophotographic process using a laser beam. In this case, it may form a tonner image on a photoconductive drum, then transfer the image onto paper, and finally fix the image by applying heat and pressure to the image using a fixing device. Instead, ink droplets may be applied for printing.

The scanner 34 scans an original image copy that is set on a contact glass, then applies analog/digital (A/D) conversion on reflected light, and executes publicly known image processing techniques to obtain the digital image data with a prescribed resolution.

Correspondences between units in FIG. 7 and FIG. 9 are as follows. The image input unit 601 in FIG. 7 and the scanner 34 in FIG. 9 correspond to each other. Similarly, the image input unit 602 and the plotter 33, the image storing unit 603 and the HDD 15, the image analyzing unit 604 and the CPU 11, the parameter storing unit 605 and the HDD 15, and the image processing unit 606 and the ASIC 16, correspond to each other, respectively.

FIG. 10 is a functional block diagram of the color tone conversion parameter generating system 600, or the MFP 700 that includes an image input unit 41, a color space selection unit 42, a color space conversion unit 43, a pixel value mapping unit 44, a color component mapping unit 45, a color tone reproduction characteristics estimation unit 46, a color tone conversion parameter fixing unit 47, and a color tone conversion unit 48.

The image input unit 41 captures the reference printed material and the user printed material which are output results of the original image data, and generates the reference image data and the user image data.

The color space selection unit 42 selects a color space with which pixels are distributed uniformly in shades using at least one of the original image data, the reference image data, and the user image data.

The color space conversion unit 43 converts the color space of the original image data, the reference image data, or the user image data into the color space selected by the color space selection unit 42.

The pixel value mapping unit 44 identifies pairs of a pixel in the original image data and a pixel in the reference image data that have the same position in the respective images, using the geometric transformation parameters. Then, the pixel value mapping unit 44 generates pixel value mapping data between these pairs of pixel values. Similarly, the pixel value mapping unit 44 identifies pairs of a pixel in the original image data and a pixel in the user image data that have the same position in the respective images, using the geometric transformation parameters. Then, the pixel value mapping unit 44 generates pixel value mapping data between these pairs of pixel values.

Using the pixel value mapping data, the color component mapping unit 45 determines corresponding color components between the color components in the original image data and the color components in the reference image data, and corresponding color components between the color components in the original image data and the color components in the user image data. The color component mapping unit 45 generates color component mapping data from the determined correspondences.

The color tone reproduction characteristics estimation unit 46 estimates color tone reproduction characteristics data using the color component mapping data.

The color tone conversion parameter fixing unit 47 fixes color tone conversion parameters using the color tone reproduction characteristics data.

The color tone conversion unit 48 applies a color conversion to the original image data.

[Steps of the Processing]

FIG. 11 is a flowchart illustrating a procedure in which the image input unit 41 captures a reference printed material and a user printed material, then, the color tone reproduction characteristics estimation unit 46 generates color tone reproduction characteristics data. In the following description, the processing of the reference printed material and the processing of the user printed material will be explained in parallel, although these may be executed in series in practice.

The image input unit 41 captures the reference printed material and the user printed material, and generates the reference image data and the user image data at Step S101.

The color space selection unit 42 selects a color space for color tone conversion using at least one of the original image data, the reference image data, and the user image data at Step S102. There is no restriction on a color space to be selected. For example, RGB, XYZ, L*a*b*, or CMYK may be selected.

The most suitable color space is, as described with FIG. 6, a color space with which pixels are distributed uniformly in shades. Whether this condition is satisfied may be determined as in the following examples. Here, it is assumed that validity of a color space is determined after the image data (the original image data or the output Image data) has been converted.

a) Evaluation by Frequency Distribution

This is a method for utilizing frequency distributions of pixel values in an image data (the original image data or the output image data), which are generated as histograms for color channels. Here, a color channel is, for example, one of R, G, and G in RGB color space, which are elements of a color space.

By calculating statistics from the generated histograms and comparing the statistics with predetermined evaluation criteria, evaluated values for the color channels can be obtained. Examples of the statistics and predetermined evaluation criteria are as follows:

The dispersion or standard deviation is greater than a predetermined value.

The average is within a predetermined range.

The median is within a predetermined range.

The mode is within a predetermined range.

These predetermined evaluation criteria are set assuming that the most favorable distribution is the one which is even, uniform, and horizontally symmetrical about the center of a histogram.

Based on the above, the evaluated value of each color channel is calculated and modified to determine the validity of the color space. Modifications may include taking the average, using the maximum value, or the like. The validity may be determined with one of the following methods.

Calculate the standard deviation of the histogram for each color channel, take the average of the standard deviations, then adopt the color space with the greatest average.

Calculate the average of the histogram for each color channel, then adopt the color space having the greatest number of the color channels that have the average contained in a predetermined range.

FIGS. 12A-12B are schematic views illustrating evaluations based on frequency distributions. In FIG. 12A, it is assumed there are three color channels 1 to 3. If using the first method above, the color space can be determined by calculating the standard deviation of the histogram ranging from $a_1$ to $a_n$ for each color channel 1-3, taking the average of the standard deviations of the color channels 1-3 to select the color space with the greatest average. If using the second method above, the color space can be determined by calculating the average of the histogram ranging from $a_1$ to $a_n$ for each color channel 1-3, then identifying the color space having the greatest number of the color channels that have the average contained in a predetermined range. If there is no difference between the color spaces, the predetermined range may be narrowed down.

Here, care should be taken when setting evaluation criteria for statistics because the scales of histograms may differ among color spaces. For example, the value range of R in 256-shade RGB color space is 0 to 255, whereas the value range of L* in L*a*b* color space is 0 to 100. Therefore, when comparing the color spaces, scales need to be adjusted.

b) Evaluation by Cumulative Frequency Distribution

This is a method for evaluating the validity of a color space by characteristics of cumulative frequency distributions generated from the frequency distributions generated with the above method a). Examples of characteristics of cumulative frequency distributions and their evaluation criteria are as follows.

Figure 13A:
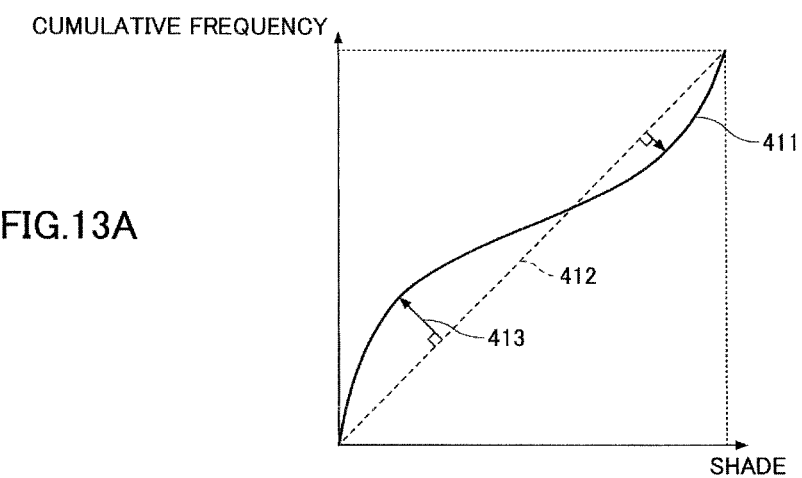
FIGS. 13A-13B are schematic views illustrating evaluations based on cumulative frequency distribution.
Figure 13B:
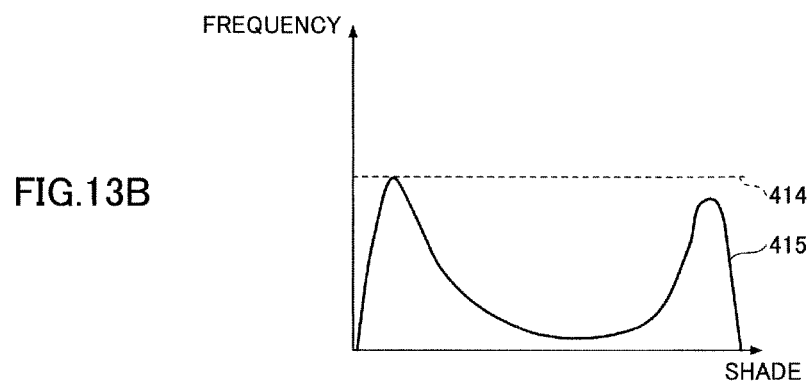

FIGS. 13A-13B are schematic views illustrating evaluations based on a cumulative frequency distribution. A cumulative frequency distribution 411 is shown in FIG. 13A, and a first derivative 415 of a cumulative frequency distribution is shown in FIG. 13B. The first derivative 415 of a cumulative frequency distribution designates the slope as well as the frequency.

If a cumulative frequency distribution similar to the cumulative frequency distribution 411 in FIG. 13A is obtained, the maximum distance 413 from the straight line whose slope is 1 (the dashed line 412 in FIG. 13A) is within a predetermined range.

If a cumulative frequency distribution similar to the cumulative frequency distribution 411 in FIG. 13A is obtained, the sum of squares of error differences, or the maximum distance 413 from the straight line whose slope is 1 is within a predetermined range.

The first derivative 415 of a cumulative frequency distribution similar to the cumulative frequency distribution 411 has the maximum value under a predetermined value (threshold value 414).

As described with the method a), these predetermined evaluation criteria are set assuming that the most favorable distribution is the one which is even, uniform, and horizontally symmetrical about the center of a histogram. If a cumulative frequency distribution is generated from the most favorable frequency distribution, the cumulative frequency distribution is equivalent to the straight line with the slope 1. Therefore, evaluation criteria can be set from the viewpoint that smaller displacement from the straight line with the slope 1 is better.

Based on the viewpoint, the evaluated value for each color channel is calculated and modified to determine the validity of the color space. The validity may be determined with one of the following methods.

Calculate the maximum distance 413 from the straight line 412 with the slope 1 for each color channel, then adopt the color space with the minimum of the maximum distances.

Calculate the squares of error differences from the straight line 412 with the slope 1 for each color channel, then adopt the color space with the minimum average of the squares of error differences.

c) Evaluation by Correspondence Matrix

This is a method for evaluating the validity of a color space by characteristics of a matrix in which pixels in the original image data are in correspondence with pixels in the output image data. How to generate the matrix will be described later at the section describing "b) Recording in matrix format" for Step S104 in FIG. 11. Examples of characteristics of the matrix and their evaluation criteria are as follows.

Figure 14A:
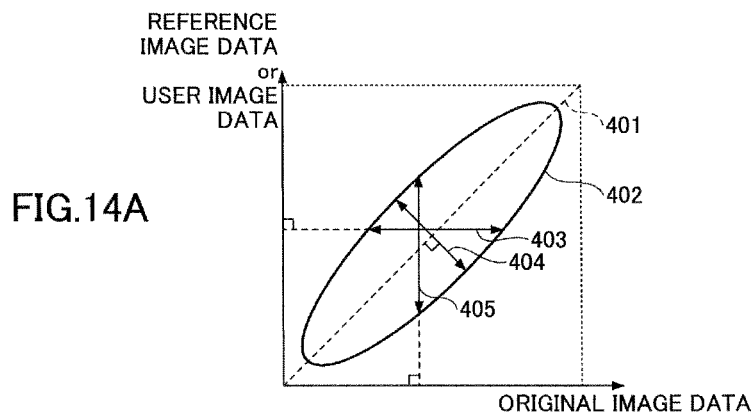
FIGS. 14A-14B are schematic views illustrating an evaluation based on a correspondence matrix.
Figure 14B:
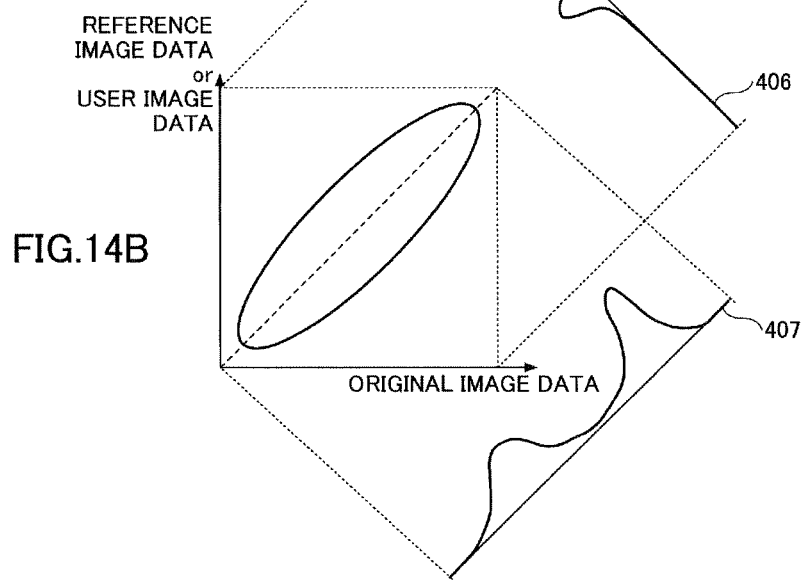

FIGS. 14A-14B are schematic views illustrating an evaluation based on a correspondence matrix. In FIG. 14A, an oval 402 represents cells in a correspondence matrix that have votes over a predetermined number. Namely, in the oval 402, the cells with the votes are distributed. In FIG. 14B, histograms are shown. One histogram 407 represents a projection of the distribution of cells in the matrix having votes over the predetermined number, which is projected on the straight line with the slope 1. Another histogram 406 represents a projection of the distribution projected on the straight line with the slope −1.

The sum of squares of error differences or the maximum distance between the distribution of cells in the matrix having votes over the predetermined number and the straight line with the slope is 1 is smaller than a predetermined value.

The maximum width of the distribution of cells in the matrix having votes over the predetermined number is smaller than a predetermined value, where the maximum width is either of the maximum width in the horizontal direction 403, the maximum width in the vertical direction 405, or the maximum width along the straight line with the slope −1 404.

In the histogram 407 of the distribution of cells in the matrix having votes over the predetermined number, which is projected on the straight line with the slope 1, the dispersion or standard deviation is greater than a predetermined value.

In the histogram 406 of the distribution of cells in the matrix having over the predetermined number of votes, which is projected on the straight line with the slope −1, the dispersion or standard deviation is smaller than a predetermined value.

Based on the above, the evaluated value of each color channel is calculated and modified to determine the validity of the color space. The validity may be determined with one of the following methods.

Calculate squares of error differences or the maximum distance between the distribution of cells in the matrix having votes over the predetermined number and the straight line with the slope is 1 for each color channel, then adopt the color space with the minimum of the averages of the squares of error differences.

Calculate the standard deviation of the histogram 407 of the distribution of cells in the matrix having votes over the predetermined number, which is projected on the straight line with the slope 1 for each color channel, then adopt the color space with the maximum of the averages.

After the color space selection unit 42 has selected the color space as above, the color space conversion unit 43 converts the original image data and the output image data into the selected color space at Step S103. Here, the conversion into the selected color space may be skipped if the converted image data into candidate color spaces has been stored at Step S102.

Next, the pixel value mapping unit 44 identifies the correspondence between a pixel value in the original image data and a pixel value in the reference or user image data at the same position at Step S104. Having completed the alignment of the position for the original image data and the reference or user image data, the pixel value mapping unit 43 obtains corresponding pixel values in two images to generate the pixel value mapping data.

In case that the alignment of the image data is done after the geometric transformation has been applied to the image data, the corresponding pixels mean the pixels at the same position. On the other hand, in case that the geometric transformation has not been applied to the image data, one of two pixels may have applied the coordinate transformation and if the transformed position is the same as the non-transformed position of another pixel, these two pixels are regarded as the corresponding pixels.

Pixel value mapping data may be recorded in several ways, for example, a recording in list format, or a recording in matrix format. It is assumed that both the original image data and the reference or user image data are RGB images whose color components have 256 shades.

a) Recording in List Format

Color component values are recorded in list format as follows:

a-1) Provide three copies of list format.
a-2) Select a pair of coordinate values in the original image data.
a-3) Add a pair of R component values to a first list format for R components. The added pair consists of R component value of the pixel at the coordinate values selected in a-2 in the original image data, and R component value of the corresponding pixel in the reference or user image data.
a-4) Similarly, G components and B components are added to a second list format for G component and a third list format for B component, respectively.
a-5) Iterate the above steps for all the coordinate values in the original image data.

These list formats may be sorted in ascending or descending order if necessary.

b) Recording in Matrix Format

Correspondence relationships of color component values are determined by voting on matrices as described in the following steps. The vertical axis in a matrix represents values in the original image data, and the horizontal axis in a matrix represents values in the reference or user image data.

b-1) Provide three copies of matrix format with 256 rows and 256 columns.
b-2) Select a pair of coordinate values in the original image data.
b-3) Cast one vote to a position in a matrix for R-component whose row number is equal to the value of the pixel at the coordinated selected at b-2), and whose column number is equal to the value of the corresponding pixel in the reference or user image data.
b-4) Similarly, voting for the correspondence of G-component values is done on a matrix for G-component, voting for the correspondence of B-component values is done on a matrix for B-component, respectively.
b-5) Iterate the above steps for all the coordinate values in the original image data.

Specifically, suppose a pixel at certain coordinate values in the original image data has R-G-B pixel values of (128, 130, 132), and the corresponding pixel in the reference or user image data, has R-G-B pixel values of (132, 130, 126). In this case, one vote is cast for the row 128 and the column 132 in the matrix for R-component, one vote is cast for the row 130 and the column 130 in the matrix for G-component, and one vote is cast for the row 132 and the column 126 in the matrix for B-component. It is noted that the assignment of axes is interchangeable, and may be determined as appropriate.

To simplify the processing, coordinate values in the original image data may be restricted to a certain range of values, or values at predetermined intervals, instead of iterating all the values. This simplification is applicable to both the list format and the matrix format.

Next, the color component mapping unit 45 identifies correspondences of color component values between the original image data and the reference or user image data, at Step S105. Using the pixel value mapping data, the color component mapping unit 44 generates the color component mapping data by identifying the correspondence of a color component value in the original and a color component value in the reference or user image data.

In a similar way as in Step S104, the following explanation assumes the original image data and the reference or user image data are RGB images whose color components have 256 shades.

a) List Format

In a case where the pixel value mapping data is recorded in the list format, the following steps are executed.

a-1) Select a value in a color component in the original image data.
a-2) Obtain the list corresponding to the color component selected at a-1).
a-3) Obtain all the records corresponding to the value selected at a-1) from the list obtained at a-2).
a-4) Synthesize a color component value of the reference or user image data from all the records obtained at a-3,
a-5) Record the correspondence between the color component value in the original image data selected at a-1) and the value synthesized at a-4) as an element in the color component mapping data.
a-6) Iterate the above steps for each value of each color component.

If only one record is obtained at a-3), the color component mapping unit 44 uses the obtained record value at a-4) as it is. If multiple records are obtained at a-3), values in the reference or user image data, are synthesized into one value. Multiple values are synthesized by methods such as a method using the average value, a method using the mode, or a method using the median.

b) Matrix Format

In a case where the pixel value mapping data is recorded in the matrix format, the following steps are executed.

b-1) Select a value in a color component in the original image data.
b-2) Obtain the matrix corresponding to the color component selected at b-1).
b-3) Obtain the row corresponding to the value selected in b-1) from the matrix obtained at b-2).
b-4) Synthesize a value from the values at the voted for column in the row obtained at b-3).
b-5) Record the correspondence between the color component value in the original image data selected at b-1) and the synthesized value at b-4) as an element of the color component mapping data.
b-6) Iterate the above steps for each value of each color component.

If only one column has votes in the obtained row at b-4), the color component mapping unit 44 adopts the column number as the synthesized value. If multiple columns have votes in the obtained row at b-4), these are synthesized into one value before utilization. Methods used for synthesis are similar to those for a), except that the number of votes is used as the number of appearances of the column number.

It is desirable to record if there are color component values not used in the original image data. This information may be utilized in the next step.

Next, the color tone reproduction characteristics estimation unit 46 estimates color tone reproduction characteristics at Step S106, using a series of data elements in the color component mapping data. The color tone reproduction characteristics may use the color component mapping data as it is, or with some modification. The purpose of modification is to curb an extreme variation of values, or to improve the stability of the characteristics curve.

Examples of modification of the color component mapping data are as follows:

a) Moving Average

This is a method to take a weighted average of a series of data elements including the data element under consideration and data elements before and after. The range of data elements may be determined according to required smoothness of values of data series. The smoother the values of data series are required to be, the wider the range needs to be. The weight for taking an average may be the same to all the data elements, or inversely proportional to the distance from the data element under consideration.

Before taking a moving average, a series of data elements needs to be sorted in ascending order, or descending order. In addition, if there are color component values not used in the original image data, some data elements may be lacking after the sort. These lacking elements should be excluded before taking a weighted average so that these elements will not affect the other data elements. The lacking elements may be identified by checking whether the data elements are continuous or not, or by using the information about unused color component values recorded at the previous step.

b) Approximation by Line or Curve

A series of data elements may be approximated by using a linear function, a quadratic function, a spline function, or an exponential function.

c) Interpolation or Approximation by Line or Curve with Reduced Number of Shades The number of shades used in a series of data elements in the color component mapping data may be reduced by the following methods:

A) The range of shades is partitioned into equal intervals into which several shades are included and integrated. The number of partitions and/or the width of a partition may be predetermined or determined dynamically.

Figure 15A:
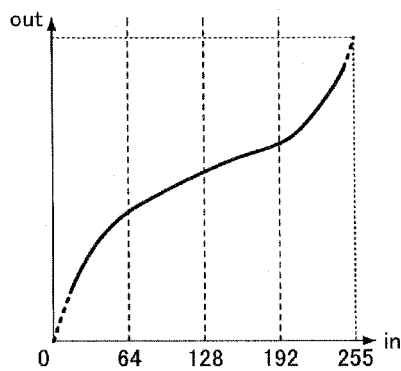
FIGS. 15A-15C are schematic views illustrating cases in which the number of partitions and/or the width of a partition is predetermined.

A-1) Case with predetermined number of partitions, or predetermined width of a partition FIG. 15A is a schematic view illustrating a case in which the number of partitions and/or the width of a partition are predetermined. In FIG. 15A, 256 shades from 0 to 255 are partitioned into a predetermined number of partitions, four, in this case. Shades are divided into four partitions including shades of 0 to 63, 64 to 127, 128 to 191, and 192 to 255, respectively. Each partition includes 64 shades that will be reduced to one shade, or treated as having the same conversion characteristics. It is noted that giving a predetermined value of the width of a partition has the same effect.

A-2) Case with dynamically determined number of partitions, or width of a partition partitions The number of partitions or the width of a partition with equal intervals may be determined by taking the number of pixels into account. For example, the number of partitions may be obtained by dividing the number of pixels by a predetermined empirically-derived number.

B) The range of shades is partitioned into unequal intervals into which several shades are included and integrated.

Using the number of votes in the pixel value mapping data, the width of partition is adaptively determined so that integrated shades have the sum of votes equal to a predetermined number.

Figure 15B:
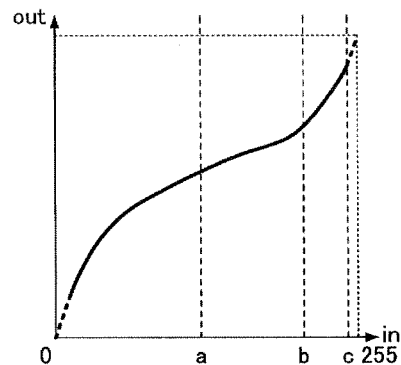

FIG. 15B illustrates an example of four partitions with unequal intervals in which 256 shades from 0 to 255 are partitioned into the ranges of 0 to a, a to b, b to c, and c to 255. Each range is reduced to a single shade. It is noted that the shade a, b, or c may be included in either one of the partitions beside it, determined as appropriate.

There are a couple of methods to determine the number of shades with unequal interval partitions. One method may divide accumulated frequency of pixels belonging to the shades into equal intervals. Another method may use a histogram of pixels belonging to the shades.

i) Method Using Accumulated Frequency of Pixels Belonging to the Shades

This method may divide the accumulated frequency of pixels belonging to shades into equal intervals. Then, the method uses the shades at delimiting positions for partitioning.

Figure 15C:
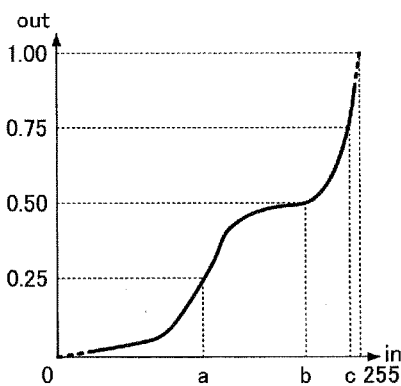

FIG. 15C illustrates an example of four partitions into which 256 shades ranging from 0 to 255 are distributed with unequal intervals. Taking 1.0 as the maximum value of the accumulated frequency on the vertical axis, shades at delimiting positions for partitioning are determined to be those shades at 0.25, 0.50, 0.75, which are the shade "a", "b", and "c", respectively. According to this partitioning, the number of data elements is the same for each partition. This means each of the transformation characteristics will be given to the same number of pixels.

ii) Method Using a Histogram of Pixels Belonging to Shades

Figure 16A:
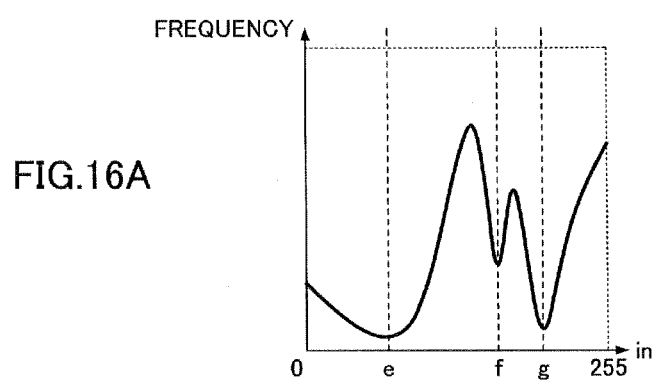
FIGS. 16A-16B are schematic views illustrating reduction of the number of shades in original image data.

FIG. 16A illustrates the method that makes a histogram of pixels belonging to shades, then partitions at shades of e, f, g, which have minimal frequencies. According to this partitioning, the number of times switching of transformation characteristics may be reduced.

After reducing the number of shades, an interpolation or a line/curve approximation will be used to recover the original number of shades from the integrated shades.

Figure 16B:
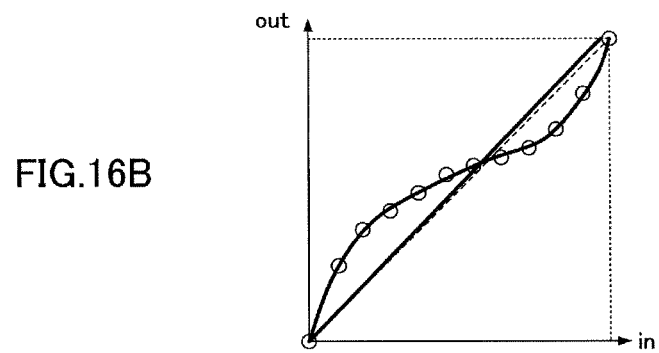

FIG. 16B illustrates an example of recovering the original number of shades from the reduced shades by using linear approximation or curve approximation. Circles show integrated data items. The solid line shows an example of linear approximation. The solid curve shows an example of curve approximation. It is desirable to select a function used for approximation according to the tendency of integrated data items. By using interpolation or line/curve approximation in this way, peculiar conversions may be excluded from estimated transformation characteristics. A peculiar conversion may be caused by a small number of pixels.

[Determination of Color Tone Conversion Parameters]

Figure 17:
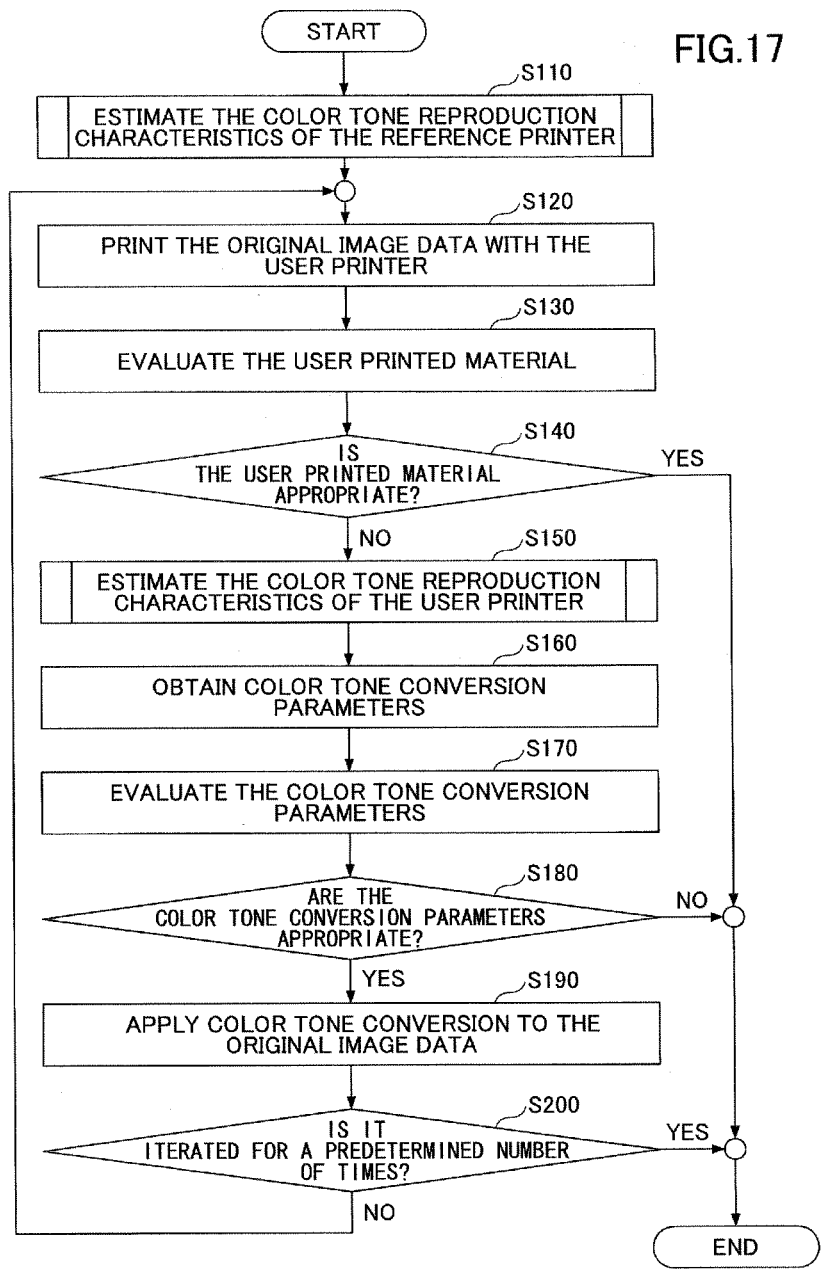
FIG. 17 is a flowchart illustrating the steps executed by a color tone conversion parameter generating system, or by an MFP, to generate color tone conversion parameters.

Next, determination of color tone conversion parameters will be explained. FIG. 17 is a flowchart illustrating the steps executed by the color tone conversion parameter generating system 600, or by the MFF 700, to generate color tone conversion parameters.

First, Step S110, "Estimate the color tone reproduction characteristics of the reference printer", and Step S150, "Estimate the color tone reproduction characteristics of the user printer" have been explained with the steps in FIG. 11. It is noted that S110 and S150 may be executed just once. If executing multiple times, the original image data that is not the data after the color tone conversion should be used at S110 and S150.

Next, for example, a user may print the original image data with the user printer 200 at Step S120. By printing the original image data with the user printer 200, a user printed material is obtained. The user inputs the user printed material into the scanner 34 in FIG. 9 that corresponds to the scanner 300 in FIG. 4, simply referred to as the scanner 300 hereafter.

The color tone conversion parameter fixing unit 47 evaluates the user printed material at Step S130, then, compares the user printed material and the reference printed material to evaluate the quality of the user printed material at Step S140.

If the quality of the user printed material is sufficient, the branch labeled "YES" at S140 is taken and the processing ends. Otherwise, the branch labeled "NO" at S140 is taken and the processing proceeds to Step S150.

Methods to evaluate the quality of the user printed material may include a method using color difference with the reference printed material, a method using hue difference, or a method using the absolute value of the difference of each color component. It is noted that the evaluation of the quality may be done visually.

a) Method Using Color Difference

Color difference is the distance of two colors in L*a*b* color space or L*u*v* color space. Since the present embodiment uses printers as the image output device, L*a*b* color space will be used in the following explanation.

The color difference in L*a*b* color space, $\Delta E^*ab$, is defined by the following formula:

$$\Delta E^*_{ab} = \sqrt{(\Delta L^*)^2 + (\Delta a^*)^2 + (\Delta b^*)^2} \qquad \text{[Formula 1]}$$

where $(\Delta L^*, \Delta a^*, \Delta b^*)$ are chromaticity differences between two colors in L*a*b* color space. The following example illustrates steps to obtain the color difference between the reference printed material and the user printed material.

(1) Input the reference printed material into the scanner 300 and obtain the reference image data.

(2) Input the user printed material into the same scanner 300 and obtain the user image data.

(3) Convert the reference image data and the user image data into a device independent color space, such as XYZ color space, by using the color profile of the scanner 300.

(4) Convert the reference image data and the user image data converted into the device independent color space into L*a*b* color space.

(5) Obtain the color difference of each pixel using the above formula.

It is noted that two different scanners 300 may be used to scan the reference image data and the user image data, respectively, instead of the single scanner 300, under the condition that the data can be converted into a device independent color space using the color profile of scanners.

When using a single scanner 300, it may not be needed to convert into a device independent color space using the color profile of the scanner. When quantitatively evaluating the color difference, the conversion into a device independent color space is required because absolute values matter. When qualitatively evaluating the color difference, the conversion into a device independent color space may be skipped as it is sufficient to obtain a relative tendency.

After the color difference of each pixel is obtained, the information may be analyzed statistically to evaluate the quality of the user printed material quantitatively. Analysis methods may include those using the average value, the maximum value, the distribution, or the dispersion of color differences.

The quality may be determined as sufficient or not in the following ways:

The average value of color differences is within a predetermined range or not.

The maximum value of color differences is within a predetermined range or not.

The dispersion of color differences is within a predetermined range or not. It is noted that when evaluating the user printed material, it is desirable that contours appearing in the image data be removed.

This is because large color differences may appear in the contours due to the reasons as follows:

It is difficult to align the position of contours in a later step.

The reproduction of contours may differ from printer to printer, especially in tint of color or sharpness.

Since the area of contours occupies a very small portion when compared to the whole area of the printed material, the influence of the contours on overall visual evaluation of the color tone may be limited. On the other hand, in a quantitative evaluation, large color differences in the contours, or outliers, may reduce the reliability of evaluation results. Therefore, the removal of contours may be needed to produce evaluation results with higher precision.

Methods for detecting contours may include binarization, or edge detection. A method using binarization divides the image data into black and white areas according to a predetermined threshold value to determine contours where a black area and a white area are adjacently located. A method using edge detection generates edge image data using Sobel method and the like. Then, the method binarizes pixels with a predetermined threshold value, and determines contours where pixels have a pixel value above the threshold value.

There are relaxation methods for the above problem without removing contours. For example, a method may smooth the image data including contours to reduce the color difference appearing at contours. Smoothing may be done with conventional techniques such as averaging filter or low-pass filter.

b) Method Using Hue Difference

The hue difference in L*a*b* color space, ΔH*ab, is defined by the next formula:

$$\Delta H^*_{ab} = \sqrt{(\Delta E^*_{ab})^2 - (\Delta L^*)^2 - (\Delta C^*_{ab})^2} \quad \text{[Formula 2]}$$

where ΔE*ab is the color difference, (ΔL*,Δa*,Δb*) are chromaticity differences between two colors, and ΔC*ab is the difference of chroma. Chrome, C*ab, defined by the next formula:

$$C^*_{ab} = \sqrt{(a^*)^2 + (b^*)^2} \quad \text{[Formula 3]}$$

The steps to obtain the hue difference between the reference printed material and the user printed material are almost the same as the steps to obtain the color difference, except for obtaining the hue difference instead of the color difference. Statistical analysis or quality judgment are also done with similar methods.

c) Method Using the Absolute Value of the Difference of Each Color Component

This method uses the absolute value of the difference of each color component between the reference printed material and the user printed material in a predetermined color space for the evaluation. Taking an RGB color space, for example, the method uses the difference of the absolute value of R-component, the difference of the absolute value of G-component, and the difference of the absolute value of B-component. The following steps illustrate an example of obtaining the absolute value of the difference of each color component between the reference printed material and the user printed material.

1) Input the reference printed material into the scanner 300 and obtain the reference image data.

2) Input the user printed material into the same scanner 300 and obtain the user image data.

3) Convert the reference image data and the user image data into a device independent color space, such as XYZ color space by using the color profile of the scanner 300.

4) Obtain the absolute value of the difference of each color component in the converted color space.

It is noted that it may not be needed to convert into a device independent color space using the color profile of the scanner as in case of the color difference. The absolute value of the difference may be obtained directly in the device dependent color space of the scanner 300. Also, statistical analysis or quality judgment is done with similar methods as done for the color difference.

The next step S150, "Estimate the color tone reproduction characteristics of the user printer 200", has already explained in FIG. 11.

Next, the color tone conversion parameter fixing unit 47 obtains color tone conversion parameters at Step S160, by combining the color tone reproduction characteristics data of the reference printer 400 and the user printer 200. Example steps are illustrated as follows:

(1) Select a color component value, in the original image data.
(2) Obtain a value in the reference image data, "s", from the color tone reproduction characteristics data of the reference printer 400 that corresponds to the selected value "a".
(3) Obtain a value in the original image data, "b", from the color tone reproduction characteristics data of the user printer 200 that corresponds to the obtained value "s".
(4) Record the correspondence of two values (a, b).
(5) Iterate above steps for each of the color component values in the original image data.

The color tone conversion parameters may be obtained by directly using or modifying the pairs of values obtained above.

a) Directly Using the Pairs of Values

The pairs of values are treated as a look-up table (LUT), which is used as the color tone conversion parameters.

b) Modifying the Pairs of Values

The values are modified with methods used in estimating the conversion characteristics such as moving average, line/curve approximation, or reduction of shades. The modified values are treated as a look-up table (LUT), which is used as the color tone conversion parameters. When using line/curve approximation, coefficients of the function may be used as the color tone conversion parameters. Similarly, when using gamma correction for the color tone conversion, the gamma values obtained with the corresponding values may be used as the color tone conversion parameters.

The color tone conversion parameter fixing unit 47 evaluates the color tone conversion parameters and determines whether they are appropriate at Steps S170, S180.

If the color tone conversion parameters are not appropriate, the branch labeled "NO" at S180 is taken and the processing ends.

If the color tone conversion parameters are appropriate, the branch labeled "YES" at S180 is taken and the processing proceed to the next step.

At the S180, the appropriateness of the color tone conversion parameters may be determined, for example, by the distance from the parameters with which the input and output are the same when the color tone conversion is applied. Assuming the color tone conversion is represented in a graph, the distance may be measured by one of the following values:
a) the accumulated sum of the absolute values of the difference between the input and the output
b) the accumulated sum of the squared values of the difference between the input and the output
c) the maximum value of the absolute values of the difference between the input and the output
d) the maximum value of the slope of the graph The color tone conversion parameters are determined as appropriate when the above values fall into a predetermined range.

Figure 18A:
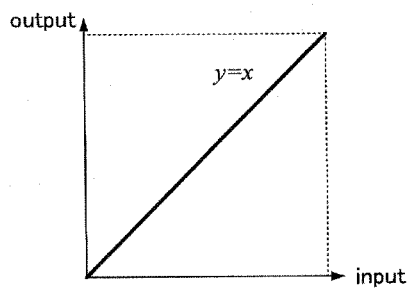
FIGS. 18A-18D are schematic views illustrating examples of color tone conversion parameters for a case in which image data remains unchanged before and after a color tone conversion.
Figure 18B:
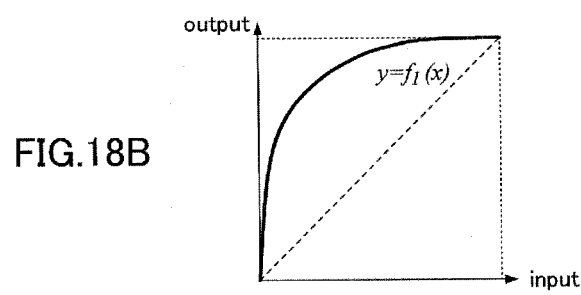
Figure 18C:
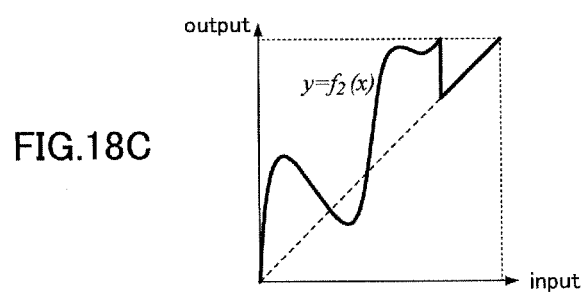

The reason why the appropriateness of the color tone conversion parameters is determined is to determine whether the execution of the color tone conversion is meaningless or not. In other words, it determines the convergence of the color tone conversion. Therefore, Step S180 may be skipped if appropriate. Execution of color tone conversion may be meaningless in the following cases.

a) Case where the Image Data Remains Unchanged Before and after Color Tone Conversion FIG. 18A illustrates an example of color tone conversion parameters with which the image data remains unchanged before and after the color tone conversion. The graph representation of the color tone conversion parameters in FIG. 18A is almost equivalent to the line of function y=x where the input and the output are the same. In a case where gamma correction is used for the color tone conversion, the graph corresponds with the gamma value of 1.0. In this case, the execution of color tone conversion is meaningless.

b) Case where the Image Data Changes Extremely Before and after Color Tone Conversion FIGS. 18B and 18C show examples of color tone conversion parameters with which the image data changes extremely from before to after color tone conversion. In FIG. 18B, the graph representing the color tone conversion is far away from function y=x where the input and the output are the same. It is desirable to avoid such a color tone conversion because it changes the color tone of the user printed material significantly. In FIG. 18C, the graph of the color tone conversion waves wildly relative to the line of function of y=x, or has discontinuous points. It is desirable to avoid such a color tone conversion because it introduces discontinuous color tone changes in the user printed material. In a case where gamma correction is used for the color tone conversion, the former graph corresponds with the gamma value that is close to zero, or extremely larger than one.

It is noted that although cases in which one output value corresponds to multiple input values, or cases with discontinuous points as shown in FIG. 18C are undesirable, these cases may be permissible depending on the degree.

Figure 18D:
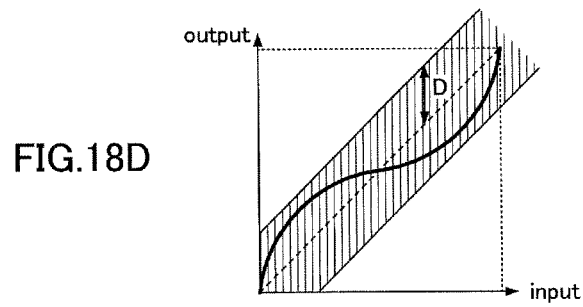

Also, as shown in FIG. 18D, it may be determined that the image data does not change extremely from before to after the color tone conversion as the graph of the color tone conversion parameters remains within a predetermined distance from the line of function of y=x. For each input value of the color tone conversion parameters, the output value is determined whether it is within plus or minus d % from the input value, or within a distance of D, where d or D denotes a predetermined value.

In a case where the color tone conversion parameters are appropriate, the color tone conversion unit 47 applies color tone conversion to the original image data at Step S190. Using the color tone conversion parameters, the unit applies the color tone conversion to the original image data to update the original image data.

A series of processing steps may be concluded at this stage of the processing. Examples of the color tone conversion include gamma correction mentioned earlier or conversion using a look-up table (LUT).

The color tone conversion is iterated a predetermined number of times. Therefore, when reaching the predetermined iteration count, which is the "YES" branch at Step S200, the processing of color tone conversions ends. Although only one time of the color tone conversion may produce a sufficient color tone conversion result, multiple executions may improve the precision of color matching.

In a case of repeating, the "NO" branch at Step S200, the color-matched original image data is taken as input and printed by the user printer 200 at Step S120, and the same processing is executed. It is noted that the original image data used in the next iteration of the loop has had applied the color tone conversion.

Although there are three termination conditions in FIG. 17, it is not necessary to execute all of these. Some of these may be skipped, although it is desirable that at least one of these is executed.

After color tone conversion, the color space conversion unit 43 replaces the color space of the original image data with the original color space. The original image data is color-matched with the reference image data with high precision because the original image data has had applied the color tone conversion in the color space where pixels are uniformly distributed in shades.

Second Embodiment

In the present embodiment, an example is taken where the first image output device is a display, the second image output device is a projector, and the image input unit 41 is a digital camera. It is assumed in the present embodiment that the two image output devices are managed by a user so that a color profile may be obtained by displaying a color chart. It is possible, however, to execute color matching using the method in the present embodiment without using a color profile.

Figure 19:
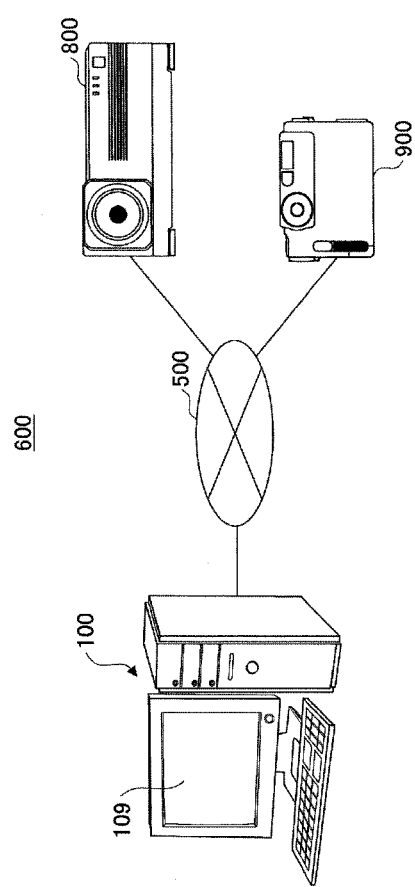
FIG. 19 is a configuration diagram of a color tone conversion parameter generation system according to a second embodiment.

FIG. 19 is a configuration diagram of a color tone conversion parameter generation system 600 according to the present embodiment. The color tone conversion parameter generation system 600 includes a computer 100, a projector 800, and a digital camera 900, which are connected with each other via a network, in the present embodiment. Comparing FIG. 19 and FIG. 4,
a) A display 109 corresponds to the reference printer 400.
b) A reference screen of the display 109 corresponds to the reference printed material.
c) The projector 800 corresponds to the user printer 200.
d) A user screen projected by the projector 800 corresponds to the user printed material.
e) The digital camera 900 corresponds to the scanner 300.

The functional block diagram is omitted here because it is the same as the one in the first embodiment.

FIG. 20 is a flowchart illustrating the steps executed by the color tone conversion parameter generating system 600, or by an MFP 700, to generate color tone conversion parameters. The steps in FIG. 20 are substantially the same as in FIG. 17 except for the devices, hence explanation of similar operations will be simplified.

The color tone reproduction characteristics estimation unit 46 or the like estimates color tone reproduction characteristics of the display 109 at Step S310. Namely, the color tone reproduction characteristics of the display 109 are estimated from the reference screen output in the display 109 and the original image data.

Next, the user projects the original image data with the projector 800 at Step S320. Namely, the user screen is obtained by projecting the original image data using the projector 800.

Next, the color tone conversion parameter fixing unit 47 evaluates the user screen at Step S330. Namely, the user screen is compared with the reference screen to evaluate quality of the user screen. If the quality of the user screen is determined as appropriate (Step S340 YES), the procedure ends, otherwise (Step S340 NO) the procedure goes to Step S350.

To evaluate quality of the user screen, color difference between the reference screen and the user screen may be used. Instead, hue difference or the maximum absolute value among differences of color components may be used. Quality may be evaluated by a visual inspection. Quality evaluation is substantially the same as in the first embodiment.

a) Method Using Color Difference

Color difference is a distance between two colors in L*a*b* color space or L*u*v* color space. L*u*v* color space is taken in the present embodiment because the display 109 and the projector BOO are used as image output devices.

Color difference in L*u*v* color space, ΔE*uv is defined by the following formula:

$$\Delta E^*_{uv} = \sqrt{(\Delta L^*)^2 + (\Delta u^*)^2 + (\Delta v^*)^2} \quad \text{[Formula 4]}$$

where (ΔL*, Δu*, Δv*) are chromaticity differences between two colors in L*u*v* color space. The following example illustrates steps to obtain the color difference between the reference printed material and the user printed material.

(1) Input the reference screen into the digital camera 900 and obtain the reference image data.
(2) Input the user screen into the same digital camera 900 and obtain the user image data.
(3) Convert the reference image data and the user image data into a device independent color space, such as XYZ color space in general, by using the color profile of the digital camera 900.
(4) Convert the reference image data and the user image data converted into the device independent color space into L*u*v* color space.
(5) Obtain the color difference of each pixel using the above formula.

It is noted that two different digital cameras 900 may be used to capture the reference image data and the user image data, respectively, instead of the single digital camera 900, under the condition that the data can be converted into a device independent color space using the color profiles of the two digital cameras 900.

When using a single digital camera 900, it may not be needed to convert into a device independent color space using the color profile of the digital camera 900. When quantitatively evaluating the color difference, the conversion into a device independent color space is required because absolute values matter. When qualitatively evaluating the color difference, the conversion into a device independent color space may be skipped as it is sufficient to obtain a relative tendency.

After the color difference of each pixel is obtained, the information about the color differences may be analyzed statistically to evaluate the quality of the user screen quantitatively. Analysis methods may include those using the average value, the maximum value, the distribution, or the dispersion of the color differences. The quality may be determined as sufficient or not in the following ways:

The average value of the color differences is within a predetermined range or not.

The maximum value of the color differences is within a predetermined range or not.

The dispersion of the color differences is within a predetermined range or not.

It is noted that when evaluating the user screen, it is desirable that contours appearing in the image data be removed. This is because large color differences may appear in the contours due to the following reasons:

It is difficult to align the position of contours in a later step.

The reproduction of contours may differ from display to display, especially in tint of color or sharpness.

Since the area of contours occupies a very small portion when compared to the whole area of the printed material, the influence of the contours on overall visual evaluation of the color tone may be limited. On the other hand, in a quantitative evaluation, large color differences in the contours, or outliers, may reduce the reliability of evaluation results. Therefore, the removal of contours may be needed to produce evaluation results with higher precision.

b) Method Using Hue Difference

Hue difference in L*u*v* color space, ΔH*uv, is defined by the following formula:

$$\Delta H^*_{uv} = \sqrt{(\Delta E^*)^2 - (\Delta L^*)^2 - (\Delta C^*_{uv})^2} \quad \text{[Formula 5]}$$

where ΔE*uv is the color difference, (ΔL*, Δu*, Δv*) are chromaticity differences between two colors, and ΔC*uv is the difference of chroma. Chroma, C*uv, is defined by the next formula:

$$C^*_{uv} = \sqrt{(u^*)^2 + (v^*)^2} \quad \text{[Formula 6]}$$

The steps to obtain the hue difference between the reference screen and the user screen are substantially the same as the steps to obtain the color difference, except for obtaining the hue difference instead of the color difference. Statistical analysis and quality determination are also done with similar methods.

c) Method Using the Absolute Value of the Difference of Each Color Component

This method uses the absolute value of the difference of each color component between the reference screen and the user screen in a predetermined color space for the evaluation. Taking an RGB color space, for example, the method uses the difference of the absolute value of R-component, the difference of the absolute value of G-component, and the difference of the absolute value of B-component. The following steps illustrate an example of obtaining the absolute value of the difference of each color component between the reference screen and the user screen.

1) Input the reference screen into the digital camera 900 and obtain the reference image data.
2) Input the user screen into the same digital camera 900 and obtain the user image data.
3) Convert the reference image data and the user image data into a device independent color space, such as XYZ color space, by using the color profile of the digital camera 900.
4) Obtain the absolute value of the difference of each color component in the converted color space.

It is noted that it may not be needed to convert into a device independent color space using the color profile of the digital camera as in case of the color difference. The absolute value of the difference may be obtained directly in the device dependent color space of the digital camera 900. Also, statistical analysis and quality determination are done with similar methods as done for the color difference.

Next, the geometric transformation parameters estimation unit 42 estimates color tone reproduction characteristics of the projector 800 at Step S350. Color tone reproduction characteristics of the projector 800 are estimated from the user screen which is the original image data output by the projector 800.

Next, the color tone conversion parameter fixing unit 47 obtains color tone conversion parameters at Step S360, by combining the color tone reproduction characteristics data of the display 109 and the projector BOO. Example steps are illustrated as follows:

(1) Select a color component value, "a", in the original image data.
(2) Obtain a value in the reference image data, from the color tone reproduction characteristics data of the display 109 that corresponds to the selected value "a".
(3) Obtain a value in the original image data, "b", from the color tone reproduction characteristics data of the projector 800 that corresponds to the obtained value "s".
(4) Record the correspondence of two values (a, b).
(5) Iterate above steps for each color component value in the original image data.

The color tone conversion parameters may be obtained by directly using or modifying the pairs of values obtained above.

a) Directly Using the Pairs of Values

The pairs of values are treated as a look-up table (LOT), which is used as the color tone conversion parameters.

b) Modifying the Pairs of Values

The values are modified with methods used in estimating the conversion characteristics such as moving average, line/curve approximation, or reduction of shades. The modified values are treated as a look-up table (LUT), which is used as the color tone conversion parameters. When using line/curve approximation, coefficients of the function may be used as the color tone conversion parameters. Similarly, when using gamma correction for the color tone conversion, the gamma values obtained with the corresponding values may be used as the color tone conversion parameters.

Next, the color tone conversion parameter fixing unit 47 evaluates the color tone conversion parameters at Step S370. If the color tone conversion parameters are determined as appropriate, the branch labeled "YES" at S380 is taken and the processing proceeds to the next step. If not appropriate, the branch labeled "NO" at S380 is taken and the processing ends.

The reason why the appropriateness of the color tone conversion parameters is determined is to determine whether the execution of the color tone conversion is meaningless or not. In other words, it determines the convergence of the color tone conversion. Therefore, Step S370 may be skipped if appropriate. Execution of color tone conversion may be meaningless for the same cases as described in the first embodiment.

If the color tone conversion parameters are appropriate, "YES" at S380, the color tone conversion unit 48 applies color tone conversion to the original image data at Step S390. Namely, the original image data has had applied the color tone conversion using the color tone conversion parameters to be updated, which concludes the series of the steps. After color tone conversion, the color space conversion unit 43 replaces the color space of the original image data with the original color space.

Further, the present invention is not limited to these embodiments, but various variations and modifications may be made without departing from the scope of the present invention.

The present application is based on Japanese Priority Application No. 2012-092278 filed on Apr. 13, 2012, with the Japanese Patent Office, the entire contents of which are hereby incorporated by reference.

What is claimed is:

1. An image processing apparatus for causing a first image output device to output first output data from original image data and a second image output device to output second output data from the original image data, the image processing apparatus comprising:
   a color space fixing device configured to determine a color space, among multiple color spaces, that is appropriate for color tone conversion, based on characteristics of pixel values constituting at least one of the original image data, first output image data obtained by capturing the first output data with an input device, and second output image data obtained by capturing the second output data with the input device, the appropriate color space being a color space in which the pixel values constituting said at least one of the original image data, the first output image data and the second output image data are distributed uniformly in shades;
   a color space conversion device configured to convert a color space of each of the original image data, the first output image data, and the second output image data to the color space determined by the color space fixing device, to generate converted original image data, first converted output image data, and second converted output image data;
   a color component mapping device configured to generate first color component mapping data containing correspondences between pixel values in the first converted output image data and pixel values in the converted original image data, and second color component mapping data containing correspondences between pixel values in the second converted output image data and pixel values in the converted original image data;
   a color tone conversion parameter fixing device configured to utilize the first color component mapping data and the second color component mapping data to generate color tone conversion parameters from pairs of a pixel value in the first output image data and a pixel value in the original image data, the pixel value in the original image data when output as the second output image data having a pixel value equal to the pixel value in the first output image data; and
   a color tone conversion device converting pixel values in the original image data in response to the color tone conversion parameters.

2. The image processing apparatus according to claim 1, wherein the color space fixing device determines that a color space among the multiple color spaces is appropriate for color tone conversion if a frequency distribution of pixel values in at least one of the original image data, the first output image data, and the second output image data is uniform in the color space.

3. The image processing apparatus according to claim 2, wherein the color space fixing device determines that a color space among the multiple color spaces is appropriate for color tone conversion if a maximum average of standard deviations of frequencies in frequency distributions of the pixel values for color channels is obtained in the color space, or if a maximum number of the color channels, each of the color channels having an average of the frequencies within a predetermined range in the frequency distribution of the pixel values for the color channel, is obtained in the color space.

4. The image processing apparatus according to claim 1, wherein the color space fixing device determines that a color space among the multiple color spaces is appropriate for color tone conversion if a cumulative frequency distribution of pixel values in at least one of the original image data, the first output image data, and the second output image data increases proportional to a frequency of the pixel values in the color space.

5. The image processing apparatus according to claim 4, wherein the color space fixing device determines that a color space among the multiple color spaces is appropriate for color tone conversion if the cumulative frequency distribution of the pixel values has a minimum of maximum distances in the color space, the maximum distance being a maximum distance between the cumulative frequency distribution and a straight line with a slope 1, or if the cumulative frequency distribution of the pixel values has a minimum of averages of square error differences between the cumulative frequency distribution and the straight line with a slope 1 in the color space.

6. The image processing apparatus according to claim 1, wherein the color space fixing device determines that a color space among the multiple color spaces is appropriate for color tone conversion by
defining a matrix having rows and columns of cells where the rows and columns correspond to value ranges of the pixel values,
defining a first matrix of the matrix, a row of the first matrix being specified by a pixel value of a pixel in the original image data, a column of the first matrix being specified by a pixel value of a pixel in the first output image data having a corresponding position with the pixel in the original image data, a cell at the specified row and column having a vote,
defining a second matrix of the matrix, a row of the second matrix being specified by a pixel value of a pixel in the original image data, a column of the second matrix being specified by a pixel value of a pixel in the second output image data having a corresponding position with the pixel in the original image data, a cell at the specified row and column having a vote,
generating at least one of the first matrix and the second matrix, and
utilizing at least the one of the generated first matrix and the generated second matrix to determine the color space.

7. The image processing apparatus according to claim 6, wherein the color space fixing device determines that a color space among the multiple color spaces is appropriate for color tone conversion if a minimum of averages of square error differences of distances between cells having more than a predetermined number of the votes in the utilized first or second matrix and a straight line with a slope 1 is obtained in the color space, or if a maximum of averages of standard deviations of a histogram generated by projecting cells having more than a predetermined number of the votes in the utilized first or second matrix on the straight line with a slope 1 is obtained in the color space.

8. The image processing apparatus according to claim 1, wherein
the color tone conversion parameter fixing device generates the color tone conversion parameters by, for each pixel value in the original image data, (i) selecting a first pixel value from the original image data, (ii) obtaining a second pixel value from the first image data corresponding to the first pixel value, (iii) obtaining a third pixel value from the second image data corresponding to the second pixel value, and (iv) pairing the first pixel value with the third pixel value.

9. The non-transitory computer-readable recording medium according to claim 1, wherein the color tone conversion parameters are generated by performing a process including, for each pixel value in the original image data:
(a) selecting a first pixel value from the original image data;
(b) obtaining a second pixel value from the first image data corresponding to the first pixel value;
(b) obtaining a third pixel value from the second image data corresponding to the second pixel value; and
(d) pairing the first pixel value with the third pixel value.

10. An image processing system comprising:
a first image output device outputting first output data from original image data;
a second image output device outputting second output data from the original image data; and
an information processing device configured to generate color tone conversion parameters,
wherein the information processing device includes
a color space fixing device configured to determine a color space, among multiple color spaces, that is appropriate for color tone conversion, based on characteristics of pixel values constituting at least one of the original image data, first output image data obtained by capturing the first output data with an input device, and second output image data obtained by capturing the second output data with the input device, the appropriate color space being a color space in which the pixel values constituting said at least one of the original image data, the first output image data and the second output image data are distributed uniformly in shades;
a color space conversion device configured to convert a color space of each of the original image data, the first output image data, and the second output image data to the color space determined by the color space fixing device, to generate converted original image data, first converted output image data, and second converted output image data;
a color component mapping device configured to generate first color component mapping data containing correspondences between pixel values in the first converted output image data and pixel values in the converted original image data, and second color component mapping data containing correspondences between pixel values in the second converted output image data and pixel values in the converted original image data;
a color tone conversion parameter fixing device configured to utilize the first color component mapping data and the second color component mapping data to generate color tone conversion parameters from pairs of a pixel value in the first output image data and a pixel value in the original image data, the pixel value in the original image data when output as the second output image data having a pixel value equal to the pixel value in the first output image data; and
a color tone conversion device converting pixel values in the original image data in response to the color tone conversion parameters.

11. A non-transitory computer-readable recording medium having a program stored therein for causing a computer to execute a method of image forming in which a first image output device outputs first output data from original image data and a second image output device outputs second output data from the original image data, the program including:
- determining a color space, among multiple color spaces, that is appropriate for color tone conversion, based on characteristics of pixel values constituting at least one of the original image data, first output image data obtained by capturing the first output data with an input device, and second output image data obtained by capturing the second output data with the input device, the appropriate color space being a color space in which the pixel values constituting said at least one of the original image data, the first output image data and the second output image data are distributed uniformly in shades;
- converting a color space of each of the original image data, the first output image data, and the second output image data to the color space determined by the color space fixing device, to generate converted original image data, first converted output image data, and second converted output image data;
- generating first color component mapping data containing correspondences between pixel values in the first converted output image data and pixel values in the converted original image data, and second color component mapping data containing correspondences between pixel values in the second converted output image data and pixel values in the converted original image data;
- utilizing the first color component mapping data and the second color component mapping data to generate color tone conversion parameters from pairs of a pixel value in the first output image data and a pixel value in the original image data, the pixel value in the original image data when output as the second output image data having a pixel value equal to the pixel value in the first output image data; and
- converting pixel values in the original image data in response to the color tone conversion parameters.

* * * * *